United States Patent
Abe

(10) Patent No.: US 6,407,765 B1
(45) Date of Patent: Jun. 18, 2002

(54) IMAGE FORMING APPARATUS

(75) Inventor: Akihiro Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/640,012

(22) Filed: Aug. 17, 2000

(30) Foreign Application Priority Data

Nov. 16, 1999 (JP) .......................................... 11-325358

(51) Int. Cl.⁷ ................................................ B41J 2/435
(52) U.S. Cl. ...................................... 347/237; 347/247
(58) Field of Search ................................ 347/131, 233, 347/240, 234, 251, 237, 247; 358/1.6, 296, 298

(56) References Cited

U.S. PATENT DOCUMENTS

| | | | |
|---|---|---|---|
| 5,450,208 A | 9/1995 | Murata | 358/296 |
| 5,691,759 A | 11/1997 | Hanson | 347/233 |
| 5,831,657 A | 11/1998 | Sakaue et al. | 347/131 |
| 6,236,425 B1 * | 5/2001 | Kobayashi et al. | 347/237 |
| 6,268,929 B1 * | 7/2001 | Ono | 358/1.6 |

FOREIGN PATENT DOCUMENTS

| | | |
|---|---|---|
| JP | 05-167809 | 7/1993 |
| JP | 06-276385 | 9/1994 |
| JP | 07-137339 | 5/1995 |
| JP | 09-193468 | 7/1997 |

* cited by examiner

*Primary Examiner*—Hai Pham
(74) *Attorney, Agent, or Firm*—Armstrong, Westerman & Hattori, LLP

(57) ABSTRACT

In an image forming apparatus, an image forming section forms an entire object image using at least two dot-sequence forming units. At that time, at least two image quality control sections corresponding to the respective dot-sequence forming units control an actual-image forming state of each of dots of the object image. A buffer section has a predetermined number of line-data buffers each for storing the line data of an individual line of image data received from the image-forming request source for temporary retention and is shared by the plural image quality control sections. In the meantime a data-store-and-read control section controls a data store operation and a data readout operation so as to execute the two operations in parallel. Because possible duplicated line data is treated in an efficient way to minimize transmission of useless line data, it is possible to reduce the number of line-data buffers to a minimum, thus resulting in a simplified apparatus construction and a reduced cost manufacturing cost.

8 Claims, 21 Drawing Sheets

| OUTPUT VALUE OF COUNTER | OUTPUT OF DECODER |
|---|---|
| 0 | a="0" |
| 1 | b="0" |
| 2 | c="0" |
| 3 | d="0" |
| 4 | e="0" |

FIG. 9

| DATA GATE NO. | GATE CONDITION |
|---|---|
| G1 | b·x·a' |
| G2 | d |
| G3 | e·y |
| G4 | b·a' |
| G5 | c·b' |
| G6 | e |
| G7 | a |
| G8 | c·b' |
| G9 | d |
| G10 | a |

FIG. 10

| DATA GATE NO. | GATE CONDITION | DATA GATE NO. | GATE CONDITION |
|---|---|---|---|
| G21 | a·y | G22 | c |
| G23 | d·x | G24 | a |
| G25 | b | G26 | d |
| G27 | e | G28 | b |
| G29 | c | G30 | e |
| G31 | c | G32 | e |
| G33 | a | G34 | c |
| G35 | d | G36 | a |
| G37 | b | G38 | d |
| G39 | e | G40 | b |

FIG. 11

| STEP | OUTPUT OF DECODER | DATA-STORING LINE-DATA BUFFER | DATA-READOUT LINE-DATA BUFFER |
|---|---|---|---|
| SET UP No.1 | a=0 | 32-1, 32-2 | |
| SET UP No2 | b=0 | 32-3, 32-4 | |
| No.1 | a=0 | 32-4, 32-5 | 32-1, 32-2<br>32-2, 32-3 |
| No.2 | b=0 | 32-1, 32-2 | 32-3, 32-4<br>32-4, 32-5 |
| No.3 | c=0 | 32-3, 32-4 | 32-5, 32-1<br>21-1, 32-2 |
| No.4 | d=0 | 32-5, 32-1 | 32-2, 32-3<br>32-3, 32-4 |
| No.5 | e=0 | 32-2, 32-3 | 32-4, 32-5<br>32-5, 32-1 |
| No.6 | a=0 | 32-4, 32-5 | 32-1, 32-2<br>32-2, 32-3 |
| No.7 | b=0 | 32-1, 32-2 | 32-3, 32-4<br>32-4, 32-5 |
| No.8 | c=0 | 32-3, 32-4 | 32-5, 32-1<br>32-1, 32-2 |
| No.9 | d=0 | 32-5, 32-1 | 32-2, 32-3<br>32-3, 32-4 |
| ...... | ...... | ...... | ...... |

FIG. 12

| LINE-DATA BUFFER | SET UP No. 1 | SET UP No. 2 | No.1 | No.2 | No.3 | No.4 | No.5 | No.6 | No.7 | No.8 | No.9 | No.10 |
|---|---|---|---|---|---|---|---|---|---|---|---|---|
| 32-1 | 0 | 0 | 0 | 3 | 3 | 8 | 8 | 8 | 13 | 13 | 18 | 18 |
| 32-2 | 0 | 0 | 0 | 4 | 4 | 4 | 9 | 9 | 14 | 14 | 14 | 19 |
| 32-3 | 1 | 0 | 0 | 0 | 5 | 5 | 10 | 10 | 10 | 15 | 15 | 20 |
| 32-4 | 1 | 0 | 1 | 1 | 6 | 6 | 6 | 11 | 11 | 16 | 16 | 16 |
| 32-5 | 1 | 1 | 2 | 2 | 2 | 7 | 7 | 12 | 12 | 12 | 17 | 17 |

FIG. 13

| Out No. | LINE-DATA BUFFER | SET UP No.1 | SET UP No.2 | No.1 | No.2 | No.3 | No.4 | No.5 | No.6 | No.7 | No.8 | No.9 | No.10 |
|---|---|---|---|---|---|---|---|---|---|---|---|---|---|
| Out1/Out2 | 32-1 | | | 0 | | 3 | | | 8 | | 13 | | 18 | ... |
| | 32-2 | | | 0 | | | 4 | | 9 | | 14 | | | ... |
| | 32-3 | | | | | | 5 | | | 10 | | 15 | | ... |
| | 32-4 | | | | 1 | | | 6 | | 11 | | | 16 | ... |
| | 32-5 | | | | 2 | | | | 7 | | 12 | | | 17 ... |
| Out3/Out4 | 32-1 | | | | | 3 | | 8 | | 13 | | 18 | ... |
| | 32-2 | | | 0 | | 4 | | 9 | | 14 | | | ... |
| | 32-3 | | | 0 | | | 5 | | 10 | | 15 | | | ... |
| | 32-4 | | | | 1 | | 6 | | | 11 | | 16 | | ... |
| | 32-5 | | | | 2 | | | 7 | | 12 | | | 17 | ... |

MAIN SCANNING DIRECTION

MAIN SCANNING DIRECTION

MAIN SCANNING DIRECTION (a)

| Sw STEP NO. | 1 | 2 | 3 | 4 | 5 | 6 | 7 | 8 | 9 | 10 | 11 |
|---|---|---|---|---|---|---|---|---|---|---|---|
| No. 1 | a | a | — | a | — | — | — | — | — | — | — |
| No. 2 | a | a | — | b | — | — | — | — | — | — | — |
| No. 3 | a | b | — | — | — | a | — | — | — | — | — |
| No. 4 | a | b | — | — | — | b | — | — | — | — | — |
| No. 5 | b | — | a | — | a | — | — | a | a | a | a |
| No. 6 | b | — | a | — | b | — | — | a | a | a | a |
| No. 7 | b | — | b | — | — | — | a | a | a | a | a |
| No. 8 | b | — | b | — | — | — | b | a | a | a | a |
| No. 9 | a | a | — | a | — | — | — | b | b | b | b |
| No. 10 | a | a | — | b | — | — | — | b | b | b | b |
| No. 11 | a | b | — | — | — | a | — | b | b | b | b |
| No. 12 | a | b | — | — | — | b | — | b | b | b | b |
| No. 13 | b | — | a | — | a | — | — | a | a | a | a |
| No. 14 | b | — | a | — | b | — | — | a | a | a | a |
| ⋮ | ⋮ | ⋮ | ⋮ | ⋮ | ⋮ | ⋮ | ⋮ | ⋮ | ⋮ | ⋮ | ⋮ |

IMAGE FORMING APPARATUS

BACKGROUND OF THE INVENTION

1. Field of the Invention

The present invention relates to an image forming apparatus for forming an image based on image data from an image-forming request source, and more particularly to an image forming apparatus suitable for use in a laser printer or copier which handles image data as a multiplicity of pieces of line data (dot sequences).

2. Description of Related Art

FIG. 14 of the accompanying drawings is a block diagram of a typical image forming apparatus as a common denominator of the conventional art (20') and the subject invention (20) described later. The conventional image forming apparatus 20', as shown in FIG. 14, generally comprises a main control section 2, an optical unit 3, a photosensitive body 4, a processing unit 5, a paper feed system 6, a low-voltage power source 7, and a high-voltage power source 8. Another element of the conventional image forming apparatus 20' is a non-illustrated fixing device.

The conventional image forming apparatus 20' is connected to an upper apparatus 1, such as a personal computer, a host computer or a server, for forming an object image on a sheet of paper or the like (hereinafter also called the paper or the print paper) based on an image-forming request or image data received from the upper apparatus 1.

The main control section 2 controls operations of the optical unit 3, the photosensitive body 4, the processing unit 5 and the paper feed system 6 and also sends the image data, which is received from the upper apparatus 1, to the optical unit 3 as image information.

The optical unit 3 exposes the photosensitive drum 4 to light to form an electrostatic latent image on the drum surface, including an image processing section described later.

The photosensitive body 4 is in the form of a drum or a belt whose surface is coated with a photosensitive substance (e.g., an optical photoconductor (OPC), organic semiconductor) and is exposed to laser light of LD (Laser Diode, a semiconductor laser 14 in FIG. 5) of the optical unit 3 in a pattern corresponding to image data.

The processing unit 5 applies toner to the photosensitive body 4 to develop the latent image on the photosensitive body 4, transfers the developed image from the photosensitive body to the paper, and clears residual toner off the photosensitive body 4.

The paper feed system 6 feeds the paper in the conventional image forming apparatus 20'. The low-voltage power source 7 supplies low-voltage power to various parts or elements, while the high-voltage power source 8 supplies high-voltage power to the photosensitive body 4 and the processing unit 5.

In the conventional image forming apparatus 20', when image data together with an image-forming request is received from the upper apparatus 1, the photosensitive body 4 is exposed to light by the optical unit 3 based on the received image data, and synchronously with this exposure, feed of the paper is started by the paper feed system 6.

The processing unit 5 develops a patterned area (electrostatic latent image) on the circumferential surface (hereinafter called the surface) of the photosensitive body 4, which has a potential as exposed to light, with toner, whereupon the toner image is transferred to the surface of the paper as the paper surface is brought into contact with the surface of the photosensitive body 4.

Subsequently, the paper feed system 6 feeds the paper, onto which the toner image has been transferred, to the fixing device where the toner image is fixed to complete the forming of an object image on the paper.

FIG. 15 is a block diagram of an image processing section 9 of the conventional image forming apparatus 20', illustrating the manner in which an image is formed using a single LD (1 beam mode).

The image processing section 9 includes, as shown in FIG. 15, a buffer section 10, an image quality control section 11, a data-transfer controller 12, a data-readout controller 13, and an LD 14. The image processing section 9 produces a video signal (pulse signal) to turn on/off the LD 14 based on the image data received from the upper apparatus 1 so that the LD 14 emits laser light in response to the pulse signal to expose the photosensitive body 4.

Here the image data received from the upper apparatus 1 contains a multiplicity of pieces of line data representing the object image, line data of each piece corresponding to a dot sequence of an individual line of the object image and including image information of the individual dots composing the dot sequence.

The LD 14 irradiates a laser beam on the surface of the photosensitive body 4 to form an electrostatic latent image there under the control of the image quality control section 11 in such a way that dot sequences corresponding to a plurality of pieces of line data contained in the image data are formed on the photosensitive body 4.

The image quality control section 11 extends the image data over a memory (not shown) and makes scanning using a matrix (at 100 in FIGS. 16–19). At that time the image quality control section 11 determines an actual-image-forming state of an individual dot, for every dot to be formed by the LD 14, based on the regional image information of that individual dot contained in the image data and the regional image information of other dots adjacent to that individual dot, and produces a pulse signal having a pulse width corresponding to the determined actual-image-forming state for outputting to the LD 14, thereby controlling the quality of the object image to be formed.

The buffer section 10 is disposed between the upper apparatus 1 and the image quality control section 11 for temporarily retaining the image data from the upper apparatus 1 and is composed of a predetermined number (4 in FIG. 15) of line-data buffers 10-1 through 10-4 each for storing line data of a single line of the image data received from the upper apparatus 1.

The data-transfer controller 12 stores a plurality of pieces of line data, which are contained in the image data from the upper apparatus 1. And the data-readout controller 13 reads the line data, which is stored in the line-data buffers 10-1 through 10-4 of the buffer section 10 by the data-transfer controller 12, into the image quality-control section 11.

The data store operation by the data-transfer controller 12 and the data readout operation by the data-readout controller 13 take place roughly at the same time.

FIG. 16, (a) through (c), show the line data needed when the image quality is controlled by the image quality control section 11 in the 1-beam mode.

For forming the image of a particular dot A, the image quality control section 11 determines an actual-image-forming state of the dot A based on the image information of dots of 5 (lines)×7 (sequences) about the dot A, as described later in connection with FIGS. 17 through 19. Specifically, an actual-image-forming state of an individual dot on the central line is determined as the line data of 5 lines extended over a memory (not shown) of the image quality control section 11 is scanned using a matrix 100 of 5 lines×7 sequences.

For making image forming in the 1-beam mode, the image data (line data) read out from the buffer section 10 by the data-readout controller 13 is inputted to the image quality control section 11 one line after another. And to determine an actual-image-forming state of each dot of line data of the 1st line partially composing the object image, as shown in (a) of FIG. 16, scanning is performed using the matrix 100 after inputting and extending the first three lines of line data L1–L3. Then, as shown in (b) of FIG. 16, an actual-image-forming state of each dot of the line data L2 is determined while the 4th line of line data L4 is inputted and extended to be scanned using the matrix 100, whereupon, as shown in (c) of FIG. 16, an actual-image-forming state of each dot of the line data L3 is determined while the 5th line of line data L5 is inputted and extended to be scanned using the matrix 100.

When necessary line data is thus extended and stored, the image quality control section 11 starts scanning using the matrix 100 and determines the actual-image-forming states of the individual dots.

As mentioned above, during the 1-beam mode, the image quality control section 11 requires line data one line after another, e.g. the line data L5 after the line data L4, to form the image of the dot A by the LD 14.

Here the scanning using the matrix 100 is performed for each line data one dot sequence to another from left to right with respect to every line of the matrix 100. With continued scanning, when a particular individual dot of each dot sequence arrives at the central position of the matrix 100, a positional relationship between the last-named dot (the central dot A) and other adjacent dots is evaluated to determine a pulse size (pulse width) for forming the image of the central dot A.

The line data to be subsequently needed for the data-readout controller 13 is sequentially inputted to the image quality control section 11 during scanning of the line data. For example, as shown in (a) of FIG. 16, the data-readout controller 13 receives the line data L4 while the image quality control section 11 performs scanning of line data around the line data L1. The foregoing procedure, i.e. scanning and determination of actual-image-forming states, is carried out for the whole image data.

FIGS. 17 through 19 illustrate how to determine an actual-image-forming state by the image quality control section 11 as the image data is scanned with respect to the matrix 100 of 5 lines×7 sequences where a particular dot A is located at the central position in the matrix 100.

In FIG. 17, only the dot A is shown in the matrix 100; in the absence of any other dot adjacent to the dot, namely, if the dot A is an isolated point, the image quality control section 11 output to the LD 14 a pulse signal such as to emphasize the dot A by displaying it on a larger scale than usual.

If the dot A partially constitutes part of a horizontal line as shown in FIG. 18, the image quality control section 11 produces a pulse signal such as to thicken the whole line for emphasis and then outputs the produced pulse signal to the LD 14. And if the dot A partially constitutes part of a slanting line as shown in FIG. 19, the image quality control section 11 performs smoothing by producing a pulse signal such as to arrange auxiliary dots indicated by ● in FIG. 12 around the dot A so that the resulting slanting line including the dot A has step-free smooth edges, realizing an improved printed image quality.

Further, another image forming apparatus is known in which an optical unit 3 composed of a plurality of LDs for exposure.

In this multi-LD image forming apparatus, the exposure time is reduced by simultaneously exposing by a plurality of adjacently arranged LDs, thus improving the printing speed. For example, in an effort to have a desired image quality, the number of LDs to be energized is selected in accordance with a target resolution (e.g., 300 dpi or 600 dip) of the object image to be formed.

Specifically, as shown in FIGS. 14 and 20, in the conventional image forming apparatus 20' whose optical unit 3 is composed of a pair of LDs 14A, 14B, exposure is performed using only one of the two LDs 14A, 14B (1-beam mode) for forming a low-resolution (e.g., 300 dpi) image, and exposure is performed using the two LDs 14A, 14B (2-beam mode) for forming a high-resolution (e.g., 600 dpi) image. Accordingly a desired image forming speed can be realized even in forming an image with high resolution, without reducing the exposure speed.

In the conventional image forming apparatus 20', it is discriminated whether image forming based on the image data received from the upper apparatus 1 should be performed in the 1-beam mode or in the 2-beam mode. In determining this operation mode, the above-mentioned image resolution can be used as a criterion for discrimination.

Further, in the double-LD conventional image forming apparatus 20', if the resolution (operation mode) is changed over to designate the high-resolution (2-beam mode) image forming from the upper apparatus 1 or a control panel (not shown) during the low-resolution (1-beam mode) image forming, the optical unit 3 switches the operation mode to the 2-beam mode. Otherwise if the low-resolution (1-beam mode) printing is set from the upper apparatus 1 or the non-illustrated control panel during the high-resolution (2-beam mode) image forming, then the optical unit 3 switches the operation mode to the 1-beam mode to perform exposure.

FIG. 20 is a block diagram showing an alternative image processing section 9' of the conventional image forming apparatus 20', illustrating the manner in which the object image is formed using the two LDs 14A, 14B (2-beam mode) The alternative image processing section 9' of FIG. 20, like the previous image processing section 9, produces a video signal (pulse signal) to energize/de-energize the LDs 14A, 14B based on the image data received from the upper apparatus 1. And the image processing section 9' includes, as shown in FIG. 20, in addition to the two LDs 14A, 14B, a buffer section 10A, an image quality control section 11A, a data-transfer controller 12A, and a data-readout controller 13A, which are associated with the LD 14A. Also the image processing section 9' includes a buffer section 10B, an image quality control section 11B, a data-transfer controller 12B, and a data-readout controller 13B, which are associated with the LD 14B.

The two LDs 14A, 14B are disposed adjacent to each other to expose adjacent two positions on a photosensitive body 4 substantially at the same time, thereby respectively forming adjacent two dots.

The two buffers 10A, 10B temporarily retain the image data from the upper apparatus 1, each being composed of a predetermined number (4 in FIG. 20) of line-data buffers 10A-1 through 10A-4; 10B-1 through 10B-4 capable of storing line data, which are transferred from the upper apparatus 1 as image data, in units of lines.

FIG. 21, (a) and (b), illustrates how to scan image data by the image quality control sections 11A, 11B in the 2-beam mode; (a) illustrates scanning of image data by the image control section 11A, and (b) scanning of image data by the image control section 11B. Hereinafter in FIGS. 21 and 22, the dot image-formed by the LD 14A is indicated by A, and the dot image-formed by the LD 14B is indicated by B.

Also in (a) and (b) of FIG. 21, each of the matrices 100A, 100B represents a dot area of 5 lines ×7 sequences about a respective one of the dots A, B.

For forming an image of the dot A, the image quality control section 11A performs scanning of the matrix 100A and determines a pulse size to form the image of the dot A, using image information of the dots in the area represented by the matrix 10A.

Likewise, for forming an image of the dot B, the image quality control section 11B performs scanning of the matrix 100B and determines a pulse size to form the image of the dot B, using image information of the dots in the area represented by the matrix 100B.

FIG. 22, (a1) through (a3) and (b1) through (b3), show line data needed for the image quality control sections 11A, 11B to perform the respective image control in the 2-beam mode. (a1) through (a3) of FIG. 22 illustrates how to scan the line data extended in a memory (not shown) of the image quality control section 11A using the matrix 100A of 5 lines×7 sequences. Likewise (b1) through (b3) of FIG. 22 illustrates how to scan the line data extended in a memory (not shown) of the image quality control section 11B using the matrix 100B of 5 lines×7 sequences.

To the image quality control section 11A, the image data (line data) read out from the buffer section 10A by the data-readout controller 13A is inputted two lines after two lines. For example, if the first 3 lines of line data L1–L3 have already been inputted as shown in (a1) of FIG. 22, then the data-readout controller 13A inputs the next 2 lines of line data L4, L5 to the image quality control section 11A where scanning takes place with respect to the matrix 100A with the line data L3 for the center.

Likewise, to the image quality control section 11B, the image data (line data) read out from the buffer section 10B by the data-readout controller 13B is inputted two lines after two lines. In the 2-beam mode, the two LDs 14A, 14B disposed adjacent to each other output the respective beams. For example, if the first 4 lines of line data L1–L4 have already been inputted as shown in (b2) of FIG. 22, then the data-readout controller 13B inputs the next 2 lines of line data L5, L6 to the image quality control section 11B where scanning takes place with respect to the matrix 100B with the line data L4 for the center.

Accordingly, at that time, the image quality control section 11A needs the line data L4, L5 when determining an actual-image-forming state of a particular dot A, and the image quality control section 11B needs the line data L5, L6 when determining an actual-image-forming state of a particular dot B. Thus the image quality control sections 11A, 11B need three lines of line data L4–L6.

Then, as shown in (a3) of FIG. 22, the line data L6, L7 are inputted to the image quality control section 11A by the data-readout controller 13A where scanning takes place with respect to the matrix 100A with the line data L5 for the center.

Likewise, as shown in (b3) of FIG. 22, the line data L7, L8 are inputted to the image quality control section 11B by the data-readout controller 13B where scanning takes place with respect to the matrix 100B with the line data L6 for the center.

Accordingly, at that time, the image quality control section 11A needs the line data L6, L7 when determining an actual-image-forming state of a particular dot A, and the image quality control section 11B needs the line data L7, L8 when determining an actual-image-forming state of a particular dot B. Thus the image quality control sections 11A, 11B need three lines of line data L6–L8.

Subsequently, in the same manner as above, the line data is inputted to each of the two image quality control section 11A, 11B two lines after two lines by a respective one of the two data-readout controllers 13A, 13B. In the meantime, the image quality control section 11A performs scanning using the matrix 10A, and the image quality control section 11B performs scanning using the matrix 100B, thus determining the respective actual-image-forming states.

FIG. 23, (a) and (b), illustrates inputting-outputting of line data of the buffer sections 10A, 10B in the 2-beam mode according to the conventional image forming apparatus 20'; (a) illustrates how to input/output the line data in the buffer section 10A, and (b), how to input/output the line data in the buffer section 10B.

In (a) and (b) of FIG. 23, on the left side of the buffer sections 10A, 10B the line data to be stored in the respective buffer sections 10A, 10B by the corresponding data-transfer controllers 12A, 12B are depicted. On the right side of the buffer sections 10A, 10B the line data to be read out from the respective buffer sections 10A,10B by the corresponding data-readout controllers 13A, 13B and to be inputted to the associated image quality control sections 11A, 11B are depicted.

As shown in (a) of FIG. 23, in the buffer section 10A, with the line data L1–L3 inputted to the image quality control section 11A, the data-readout controller 13A reads but the line data L4, L5 and transmits the readout line data L4, L5 to the image quality control section 11A (phase A1).

Further, while the data-readout controller 13A reads out the line data L4, L5 from the buffer section 10A (10A-1, 10A-2), the data-transfer controller 12A transfers the line data L6, L7, out of the image data received from the upper apparatus 1, to the buffer section 10A (10A-3, 10A-4).

Then, the data-readout controller 13A reads out the line data L6, L7 from the buffer section 10A (10A-3, 10A-4) and transmits the readout line data L6, L7 to the image quality control section 11A, and in the meantime, the data-transfer controller 12A transfers the line data L8, L9, out of the image data received from the upper apparatus 1, to the buffer section 10A (10A-1, 10A-2).

In the next step, in the same manner as above, the data-readout controller 13A reads out the line data, which has been transferred to the buffer section 10A by the data-transfer controller 12A, from the buffer section 10A and transfers the readout line data to the image quality control section 11A.

Thus, in the buffer section 10A, while the line data is transferred to two line-data buffers 10A-1, 10A-2 (or 10A-3, 10A-4), of four line-data-buffers 10A-1 through 10A-4, by the data-transfer controller 12A, the line data is read out from the other two line-data buffers 10A-3, 10A-4 (or 10A-1, 10A-2) by the data-readout controller 13A. The two line-data buffers 10A-1, 10A-2 and the two line-data buffers 10A-3, 10A-4 are alternately changed over as the image data (line data) received from the upper apparatus 1 is transmitted to the image quality control section 11A.

In the buffer section 10B, as shown in (b) of FIG. 23, the same processes as in the buffer section 10A are performed by the data-transfer controller 12B and the data-readout controller 13B. And the two line-data buffers 10B-1, 10B-2 and the two line-data buffers 10B-3, 10B-4 are alternately changed over as the image data (line data) received from the upper apparatus 1 is transmitted to the image quality control section 11B.

FIG. 24 is a circuit diagram of the image processing section of the conventional image forming apparatus, showing a data-transfer controller 12' and a data-read controller 13' in the image processing section of the image-quality-control-free type. The image processing section of FIG. 24 performs image forming as the 1-beam mode and the 2-beam mode are alternately selected. The data-transfer controller 12' is composed of switches Sw1 through Sw3; by controllably operating the individual switches Sw1 through Sw3, it is possible to control the transfer of the image data to a buffer section 10'.

Likewise, the data-readout controller 13' is composed of switches Sw4, Sw5 as shown in FIG. 24; by controllably operating the individual switches Sw4, Sw5, it is possible to control the readout of the image data from the buffer section 10' to the LDs 14A, 14B.

The buffer section 10' is composed of four line-data buffers 10'-1 through 10'-4.

The operations of the data-transfer controller 12' and the data-readout controller 13' will now be described in connection with the image forming in the 1-beam mode using the LD 14A in the image processing section of the image-quality-control-free type. First, the data-transfer controller 12' and the data-readout controller 13' fix the switches Sw2, Sw3 and the switches Sw4, Sw5 to a side and b side, respectively, whereupon the data-transfer controller 12' fixes the switch Sw1 to a side and stores the image data (line data) into the line-data buffer 10'-1 of the buffer section 10' in accordance with a timing signal.

Then the data-readout controller 13' switches the switch Sw4 to a side and reads out the line data from the line-data buffer 10'-1 to transmit the read-out line data to the LD 14A based on the timing signal.

On the other hand, during this readout of the line data, the data-transfer controller 12' switches the switch Sw1 to b side and stores the next line data into the line-data buffer 10'-3.

This line data processing takes place until the next switching timing signal is changed over. And the above-mentioned readout of the line data from the line-data buffer 10'-1 into the LD 14A takes place until this switching timing signal is changed over.

Subsequently, the data-transfer controller 12' switches the switch Sw1 to a side and stores the line data into the line-data buffer 10'-1 again. During that time, the data-readout controller 13' switches the switch Sw4 to b side and reads out the line data from the line-data buffer 10'-3 into the LD 14A.

During operation in the 1-beam mode, using only the two line-data buffers 10'-1, 10'-3 of the buffer section 10', the image processing section of the image-quality-control-free type transmits the image data (line data), which is received from the upper apparatus 1, to the LD 14.

The operations of the data-transfer controller 12' and the data-readout controller 13' will now be described in connection with the image forming the 2-beam mode in the image processing section of the image-quality-control-free type.

First, the data-transfer controller 12' and the data-readout controller 13' fix the switches Sw1, Sw2 and the switches Sw4, Sw5 to a side and b side, respectively, whereupon the data-transfer controller 12' stores the image data (line data) into the line-data buffer 10'-1 of the buffer section 10' based on a timing signal.

Then the data-transfer controller 12' switches the switch Sw2 to b side with the switch Sw1 fixed to a side and stores the next line data into the line-data buffer 10'-2. And the data-readout controller 13' switches the switches Sw4, Sw5 to a side and read out the line data from the line-data buffer 10'-1 to the LD 14a and also from the line-data buffer 10'-2 to the LD 14B in synchronism with a timing signal.

During that time, the data-transfer controller 12' switches the switch Sw1 to b side with the switch Sw3 fixed to a side and stores the next line data into the line-data buffer 10'-3, whereupon the data-transfer controller 13' switches the switch Sw3 to b side and stored the line data into the line-data buffer 10'-4.

Subsequently, the data-readout controller 13' switches the switches Sw4, Sw5 to b side and reads out the line data from the line-data buffers 10'-3, 10'-4 to the LDs 14A, 14B, respectively.

The read-out line data in the LDs 14A, 14B is inputted directly to a driver of the LDs 14 A, 14B so that the LDs 14A, 14B are driven by the inputted line data.

FIG. 25 is a circuit diagram of the data-transfer controller and the data-readout controller in the first-named image processing section 9 of the conventional image forming apparatus 20' of the image-quality-control type. The image processing section 9 of FIG. 25 also performs image forming in a selective one of the 1-beam mode and the 2-beam mode. The image processing section 9 includes a data-transfer controller 12C, buffer sections 10A, 10B, data-readout controllers 13A, 13B, image quality control sections 11A, 11B, and LDs 14A, 14B.

The data-transfer controller 12C is composed of switches Sw1 through Sw7; by controllably switching these switches, it is possible to control the transfer of image data to the buffer sections 10A, 10B (line-data buffers 10A-1 through 10A-4; 10B-1 through 10B-4).

In the meantime, the data-readout controller 13A is composed of two switches Sw8, Sw9; by controllably switching these switches, it is possible to control the readout of the image data from the line-data buffers 10A-1 through 10A-4 of the buffer section 10A to the image quality control section 11A.

Likewise the data-readout controller 13B is composed of two switches Sw10, Sw11; by controllably switching these switches, it is possible to control the readout of the image data from the line-data buffers 10B-1 through 10B-4 of the buffer section 10B to the image quality control section 11B.

FIG. 26 shows a matrix defining switching operations of the individual switches Sw1 through Sw 11 in the data-transfer controller 12C and the data-readout controllers 13A, 13B in FIG. 25. By controlling the switching operations of the individual switches Sw1 through Sw11 in accordance with this matrix, it is possible to transmit the image data, which has been received from the upper apparatus 1, successively downstream to the image quality control sections 11A, 11B.

Specifically, first the data-transfer control section 12C sets the switches Sw1, Sw2, Sw4 to a side to store the line data into the line-data buffer 10A-1 (step 1). Then the data-transfer controller 12C sets the switches Sw1, Sw2 and the switch Sw4 to a side and b side, respectively, to store the line data into the line-data buffer 10A-2 (step 2).

Subsequently, the data-transfer controller 12C sets the switches Sw1, Sw6 and the switch Sw2 to a side and b side, respectively, to store the line data into the line-data buffer 10B-1 (step 3), and also sets the switch Sw1 and the switches Sw2, Sw6 to a side and b side, respectively, to store the line data into the line-data buffer 10B-2 (step 4).

Then the data-transfer controller 12C sets the switch Sw1 and the switches Sw3, Sw5 to b side and a side, respectively, to store the line data into the line-data buffer 10A-3. And the data-readout controller 13A sets the switches Sw8, Sw9 to a side to read out the line data from the line-data buffers 10A-1, 10A-2 to the image quality control section 11A, while the data-readout controller 13B sets the switches Sw10, Sw11 to a side to read out the line data from the line-data buffers 10B-1, 10B-2 to the image quality control section 11B (step 5).

Further, in the same manner as above, the data-transfer controller 12C stores the line data into the line-data buffers 10A-4, 10B-3, 10B-4 in this order (steps 6 through 8). Then the data-readout controllers 11A, 11B switches the switches Sw8 through Sw11 to the b side to read out the line data from the line-data buffers 10A-3, 10A-4, 10B-3, 10B-4 to the image quality control sections 11A, 11B, respectively (steps 9 through 12).

The storing of the line data into the buffer section 10 in steps 9 through 12, likewise in steps 1 through 4, is carried out with respect to the line-data buffers 10A-1, 10A-2, 10B-1, 10B-2.

Subsequently, in the same manner as above, the data-transfer controller 12C and the data-readout controllers 13A, 13B controls the switching operations of the individual switches Sw1 through Sw11.

However, the foregoing conventional image forming apparatus 20' would encounter the following problems. For example, in the image-quality-control-type conventional image forming apparatus 20' in which image forming is possible in the 2-beam mode, since the image quality control sections 11A, 11B would need always two lines of line data for scanning a single line of line data, four line data buffers 10A-1 through 10A-4 and 10B-1 through 10B-4 would be required for the respective buffer sections 10A, 10B.

Accordingly, as mentioned above, in the image-quality-control-type conventional image forming apparatus in which image forming is possible using a plurality of LDs 14, there are required the data-transfer controller 12, the buffer section 10, the data-readout controller 13, and the image quality control section 11 for every LD 14. This necessitates total eight line-data buffers to store the line data for the whole apparatus, which would cause a complicated apparatus structure and retard a reduced manufacturing cost.

And in the other conventional image forming apparatus in which image forming is possible in a multi-beam mode using a plurality of LDs, scanning is performed using duplicating line data in the image quality control sections 11 provided one for each LD 14. In sending such duplicating line data from the upper apparatus 1 to the image control sections 11, first the data-transfer control section 12 stores the duplicating line data (e.g., the line data L7 in phase A1 depicted in (a) and (b) of FIG. 23) into the line-data buffers of the buffer section 10, whereupon the data-readout controller 13 reads out the duplicating line data, causing the repetition of the data storing process, which would be inefficient.

SUMMARY OF THE INVENTION

With the foregoing problems in view, it is an object of the present invention to provide an image forming apparatus in which possible duplicated line data can be efficiently treated to avoid wasteful transmission of such line data, minimizing the number of necessary buffers, and hence resulting in simplified construction of the apparatus and reduction of the cost of manufacture.

In order to accomplish the above object, according to the present invention, there is provided an image forming apparatus for forming an object image based on image data from an image-forming request source, the image data including a multiplicity of pieces of line data relating to the object image, each piece of line data corresponding to a dot sequence for a single line of the object image and containing regional image information of the individual dots composing the dot sequence, the apparatus comprising:

an image forming section having a plurality of dot-sequence forming units for forming a plurality of dot sequences simultaneously as one set, which sequences correspond to a plurality of pieces of line data contained in the image data and are disposed adjacent to one another, the image forming section being operative to form whole of the object image in a first mode, in which the object image is formed in units of the dot-sequence sets one set after another, repeatedly using the plurality of dot-sequence forming units;

a plurality of image quality control sections, corresponding to the respective dot-sequence forming units, for determining an actual-image-forming state of each of the dots to be formed by the corresponding dot-sequence forming unit, based on the regional image information of each of the dot and that of other dots adjacent to each of the dot, and for outputting the determined actual-image-forming state of each of the dot to the associated dot-sequence forming unit to thereby control the object image in quality;

a buffer section having a predetermined number of line-data buffers each for storing the line data of an individual line received from the image-forming request source as the image data to temporarily hold the image data from the image-forming request source between the image-forming request source and the image quality control sections, the buffer section being shared by the image quality control sections; and a data-store-and-read control section for controlling a data store operation of storing a plurality of pieces of line data, which are contained in the image data from the image-forming request source, simultaneously into part of the predetermined number of line-data buffers, and a data readout operation of reading a plurality of pieces of line data, which are stored in the remaining part of the predetermined number of line-data buffers, simultaneously to the image quality control sections, in a way that the data store operation and the data readout operation are executed in parallel.

As a preferred feature, the predetermined number of the line-data buffers is set to a minimum necessary number to execute the data store operation and the data readout operation in accordance with both the number of the dot-sequence forming units and the number of pieces of line data needed when the image quality control sections respectively determine the actual-image-forming states of the individual dots.

As another preferred feature, the data-store-and-readout control section includes: a data-transfer controller for controlling the data-store operation; a data-readout controller for controlling the data readout operation; a store-destination switch, responsive to the data-transfer controller, for selecting part of the line-data buffers as destination buffers into which the pieces of line data are to be simultaneously stored;

a readout-destination switch, responsive to the data-readout controller, for selecting part of the image quality control sections as a destination image quality control section to which the pieces of line-data simultaneously read out from the remaining line-data buffers are to be transferred to the selected part of the image quality control sections; and a switch controller for controlling the switching operations of the store-destination switch and the readout-destination switch in synchronism with the operation of the selected part of the image quality control sections.

As still another preferred feature, the image forming section has a function of forming the object image in a selected one of the first mode and a second mode in which the object image is formed stepwise one at a single dot sequence using a selected one of the dot-sequence forming units. And when the image forming unit forms the object image in the second mode, the switch controller controls the store-destination switch in a way that at least two of the line-data buffers for the second mode to which buffers the line data is to be transferred from the image-forming request source are changed from one to another in synchronism with the operation of the dot-sequence forming units in the second mode, and the switch controller controls also the readout-destination switch in a way that the dot-sequence forming units for the second mode to which unit the line data is to be transferred from the at least two of the line-data buffers in the second mode are changed from one to another.

As a further preferred feature, each of the dot-sequence forming units includes a semiconductor laser for emitting a laser beam to form each dot-sequence, which constitutes part of the object image.

With the foregoing features of the image forming apparatus of the present invention, it is possible to guarantee the following advantageous results:

(1) Partly since the single buffer section can be shared by the plural image quality control sections, and partly since the line data store operation and the line data readout operation can be executed in parallel, it is unnecessary to provide a plurality of buffer sections one for each image quality control section, causing a simplified construction of the apparatus and a reduction of the cost of manufacture. Further, the same line data would not be stored or read in duplicate, thus realizing an efficient data management.

(2) Since the predetermined number of the line-data buffers can be set to a minimum necessary number to execute the data store operation and the data readout operation, in accordance with both the number of dot-sequence forming units and the number of pieces of line data needed when the image quality control sections respectively determine the actual-image-forming states of the individual dots, it is possible to construct the buffer section with a decreased number of line-data buffers, simplifying the apparatus construction and hence reducing of the cost of manufacture.

(3) It is possible to surely execute the data store operation and the data readout operation improving the reliability of the image forming apparatus.

Other objects and further features of the present invention will be apparent from the following detailed description when read in conjunction with the accompanying drawings.

BRIEF DESCRIPTION OF THE DRAWINGS

FIGS. 9 and 10 are a table showing a matrix defining the switching operation between a store-destination switch and a readout-destination switch under the control of a switch controller;

FIG. 11 is a table showing a relation between the output signals from the decoder and the line-data buffers in the image processing section of the present embodiment;

FIG. 12 is a table showing the manner in which data is stored into the line-data buffers under the control of a data-transfer controller;

FIG. 13 is a table showing the manner in which data is read out from the line-data buffers under the control of a data-readout controller;

FIG. 26 is a table showing a matrix defining switching operations of various switches in the data-transfer and data-readout controllers of FIG. 25.

DESCRIPTION OF THE PREFERRED EMBODIMENT(S)

One embodiment of the present invention will now be described with reference to the accompanying drawings.

Figure 1:
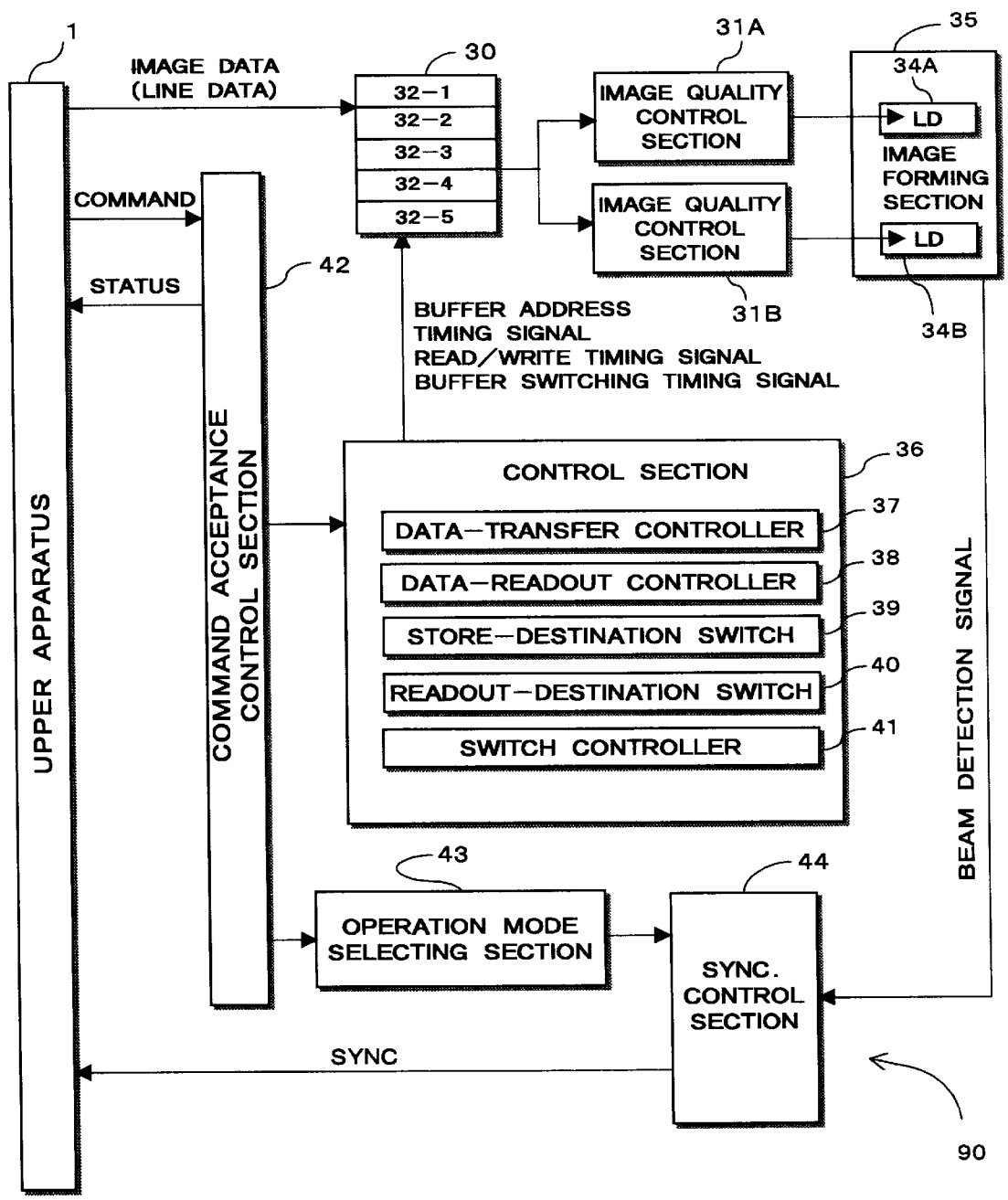
FIG. 1 is a block diagram schematically showing an image processing section of an image forming apparatus according to one embodiment of the present invention.

FIG. 1 is a block diagram of an image processing section 90 of an image forming apparatus 20 according to one embodiment of the present invention. The image processing section 90 of FIG. 1 is associated with an optical unit 3 of the image forming apparatus 20 shown in FIG. 14.

Figure 14:
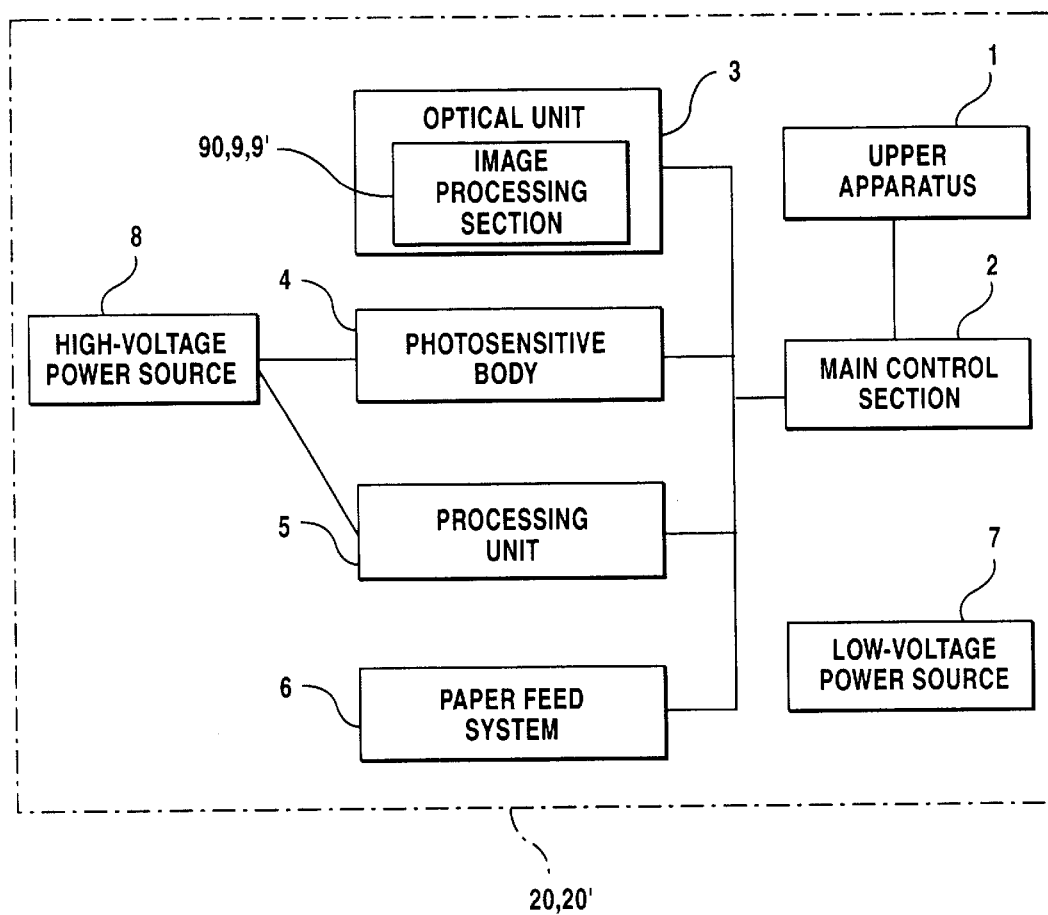
FIG. 14 is a block diagram of a typical image forming apparatus as a denominator of the conventional art and the present invention.
Figure 15:
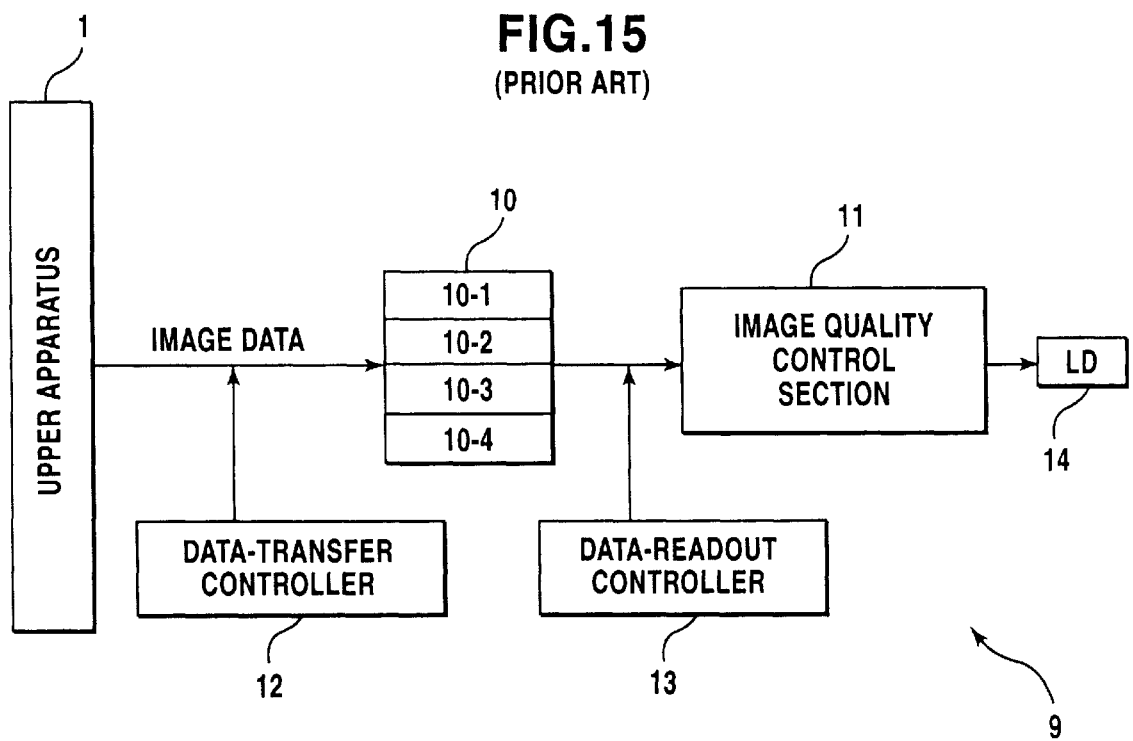
FIG. 15 is a block diagram of an image processing section of the conventional image forming apparatus.
Figure 16:
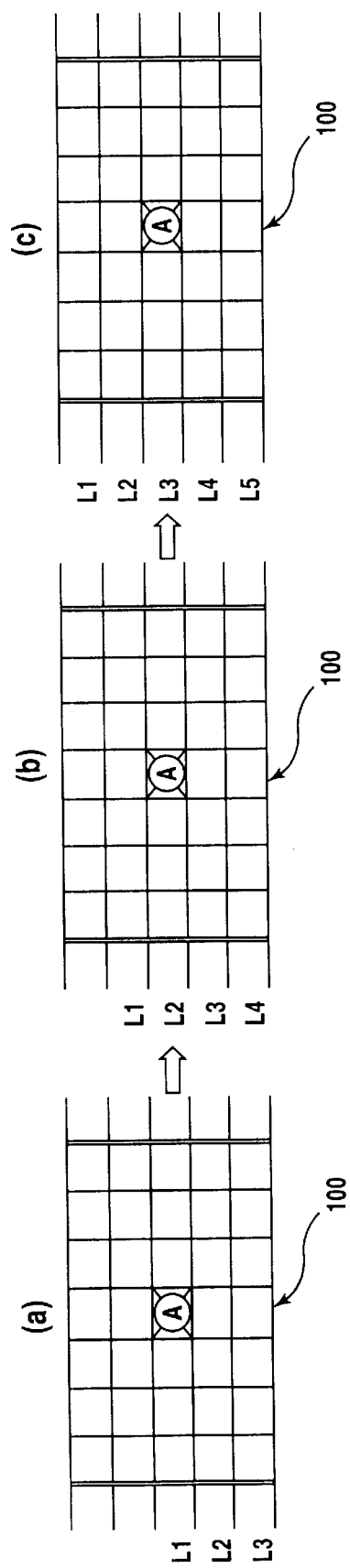
FIGS. 16, (a) through (c), shows line data needed when the image quality control section performs image quality control in a 1-beam mode.
Figure 17:
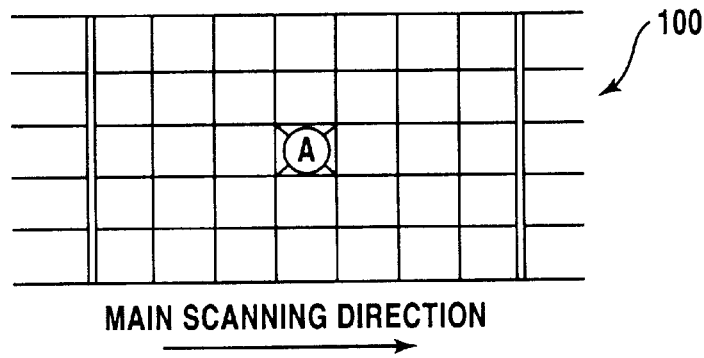
FIG. 17 is a view illustrating how the image quality control section determines an actual-image-forming state.
Figure 18:
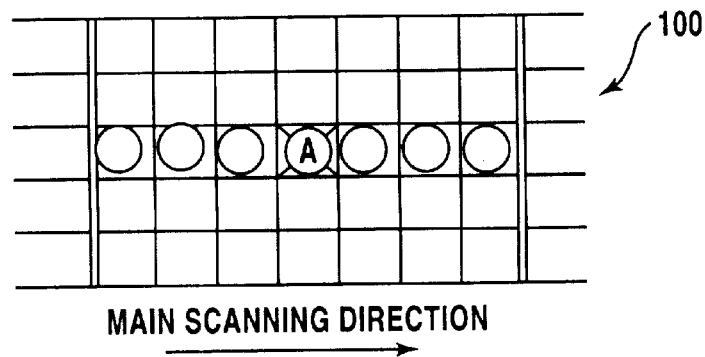
FIG. 18 is a view illustrating how the image quality control section determines an actual-image-forming state.
Figure 19:
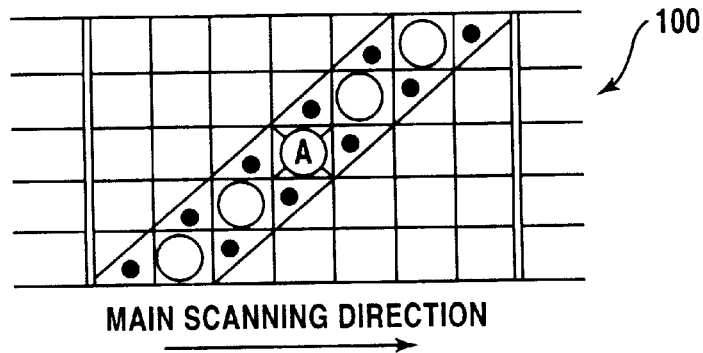
FIG. 19 is a view illustrating how the image quality control section determines an actual-image-forming state.
Figure 20:
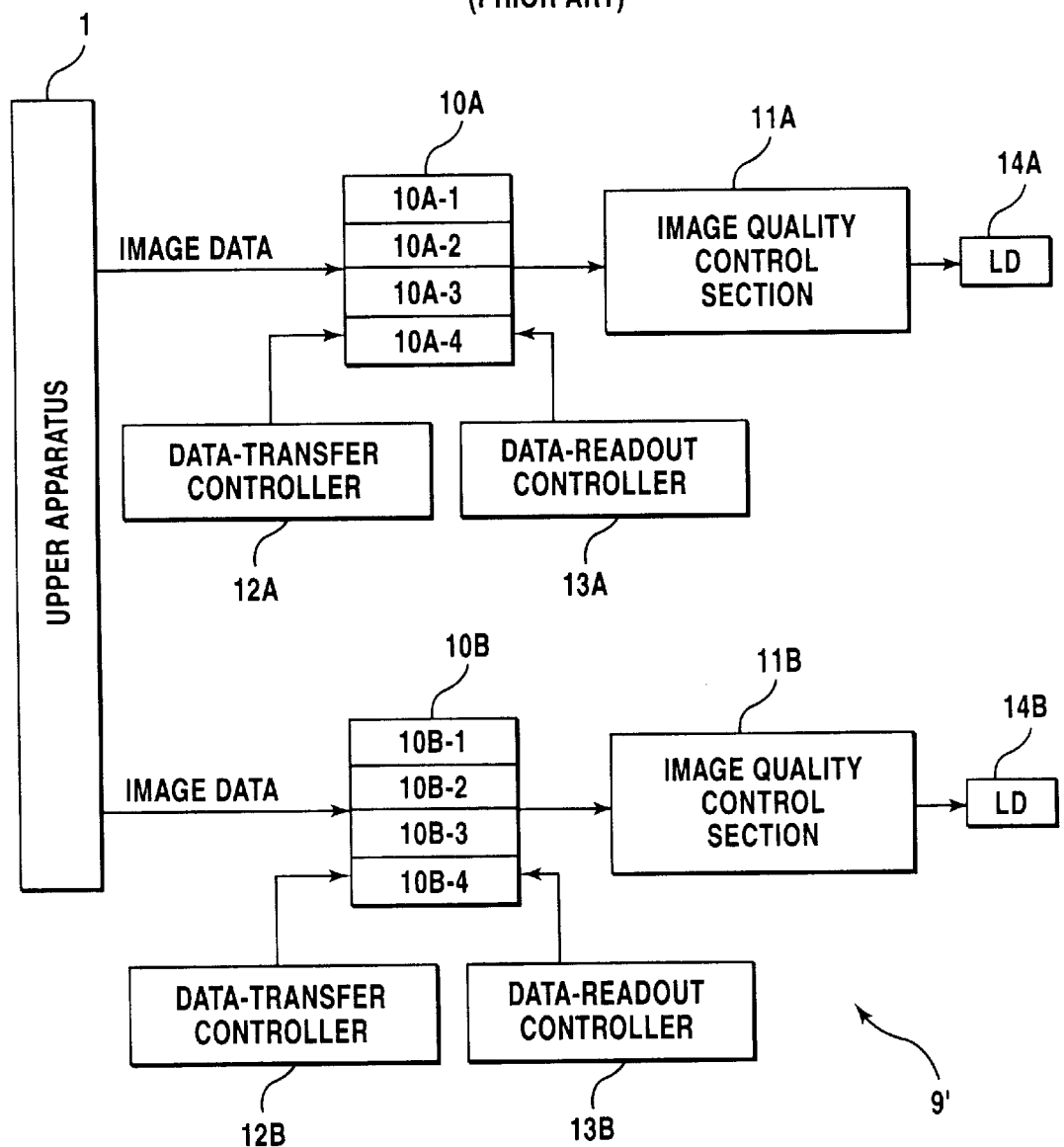
FIG. 20 is a block diagram of an image processing section of the image forming apparatus of the present embodiment.
Figure 21:
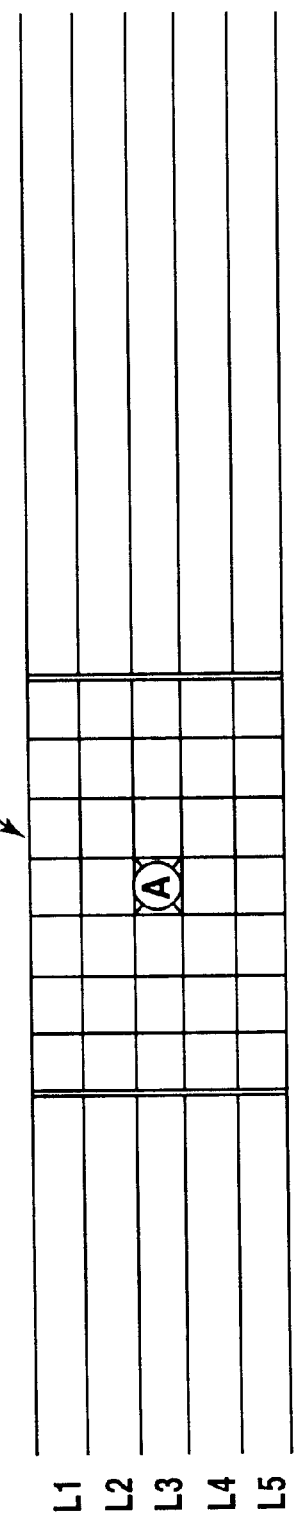
FIG. 21, (a) and (b), shows the scanning of image data performed by the image quality control section in the 2-beam mode.
Figure 21:
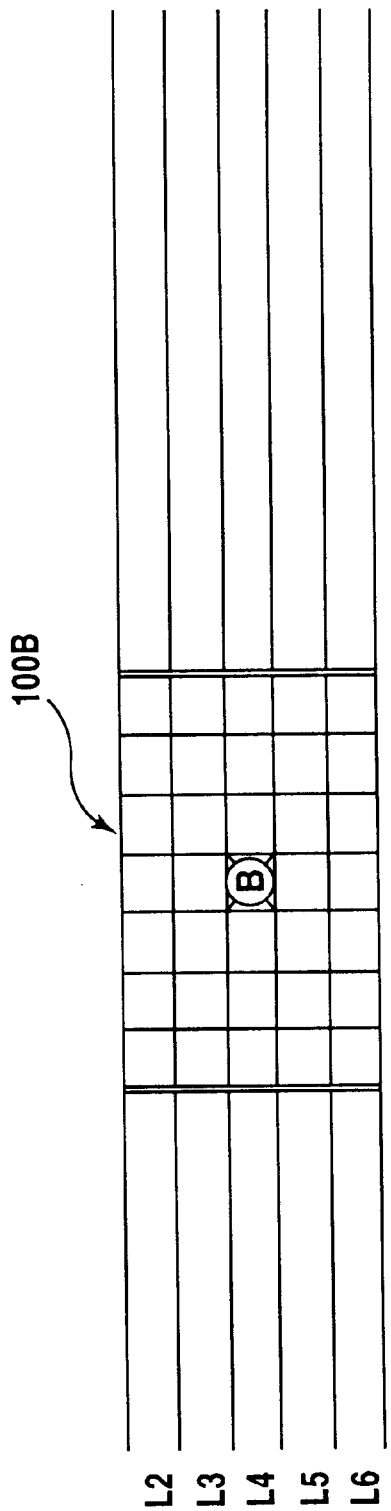

The image forming apparatus 20, like the conventional image forming apparatus 20' described above, is operatively connected with an upper apparatus (image-forming request source) 1, as shown in FIG. 14. In response to image data and an image forming request from the upper apparatus 1, the image forming apparatus 20 forms an image on a print sheet of paper or the like (hereafter called the print paper). The apparatus 20 comprises a main control section 2, the optical unit 3, a photosensitive body 4, a processing unit 5, a paper feed system 6, a low-voltage power source 7, a high-voltage power source 8, and a non-illustrated fixing unit. Like reference numbers designate similar parts or elements throughout several views, so their detail description is omitted here.

The upper apparatus 1, such as a personal computer, a host computer or a sever, functions as an image forming request source that transmits to the image forming apparatus 20 image data and a request for forming an object.

The data transmitted from the upper apparatus 1 contains a multiplicity of pieces of line data relating to the object image; the line data corresponds to one dot sequence for a single line of the object image and contains regional image information of the individual dots composing the dot sequence.

The optical unit 3 exposes the photosensitive body 4 to form a latent image on the body surface. The optical unit 3 includes the image processing section 90 described later, in which a video signal (pulse signal) for turning on/off laser diodes (LD: semiconductor laser) 34A, 34B (FIG. 1) is produced. In response to the pulse signal, the LDs 34A, 34B emit light to expose the photosensitive body 4.

The LDs 34A, 34B are disposed adjacent to one another for exposing mutually adjacent points on the photosensitive body 4 almost at the almost same timing to form dots adjacent to one another. The LDs 34A, 34B serve as a dot-sequence forming unit to form a plurality of dot sequences (two in the present embodiment) simultaneously as one set. These dot sequences correspond to a plurality of pieces of line data contained in the image data and disposed adjacent to one another. In the following description, when a specific one of the two LDs is referred to, it will be designated by 34A or 34B, and otherwise when an arbitrary one is referred to, it will be designated by 34.

The image processing section 90 comprises, as shown in FIG. 1, a buffer section 30, an image quality control section 31, an image forming section 35, a data-store-and-readout control section 36, a command acceptance control section 42, an operation mode selecting section 43, and a synchronization control section 44.

The image forming section 35 forms dot sequences contained in an object image by using the LDs 34A, 34B, and is able to form the whole object image in a first mode (2-beam mode) in which a plurality of dot sequences (two in the present embodiment) contained in the image are simultaneously formed as one set by the two LDs 34A, 34B.

Further, the image forming section 35 is able to form the object image also in a second mode (1-beam mode) in which the object image is formed stepwise one at a single dot sequence using a selected one of the two LDs 34A, 34B (LD 34A used in the present embodiment).

The image quality control sections 31A, 31B control the state of image forming, which is carried out by the image forming section 35. The image quality control sections 31A, 31B are provided one for each of the plural LDs 34A, 34B (two in the present embodiment). Specifically, the image quality control sections 31A controls the state of image forming being carried out by the LD 34A, while the image quality control section 31B controls the state of image forming being carried out by the LD 34B.

More specifically, the image quality control sections 31A, 31B determine an actual-image-forming state of each of the dots to be formed by the corresponding LDs 34A, 34B, based on the regional image information of each dot and that of other dots adjacent to treat individual dot, and output the obtained actual-image-forming state to the corresponding LDs 34A, 34B, thus controlling the state of image forming being carried out by the image forming section 35.

In the following description, when a specific one of the two image quality control section is referred to, it will be designated by 31A or 31B, and when an arbitrary one is referred to, it will be designated by 31.

The buffer section 30 has a predetermined number (five in the present embodiment) of line-data buffers 32-1 through 32-5 each for storing the line data of an individual line received from the upper apparatus 1 as the image data, temporarily holding the image data from the upper apparatus 1 between the upper apparatus 1 and the image quality control sections 31A, 31B.

In the following description, when a specific one of the plural line-data buffers is referred to, it will be designated by one of 32-1 through 32-5, and when an arbitrary one of the plurality of line-data buffers is referred to, it will be designated by 32.

The predetermined number of the line-data buffers 32 is set to a minimum necessary number to store a plurality of pieces of line data, which are contained in the image data from the upper apparatus 1, simultaneously into part of the predetermined number of line-data buffers 32 and to read out a plurality of pieces of line data, which are stored in the remaining part of the predetermined number of the line-data buffers 32, simultaneously to the plural image quality control sections 31, in accordance with both the number of the LDs 34 and the number of pieces of line data being needed when the image quality control sections 31 respectively determine the actual-image-forming states.

Specifically, the number X of the line-data buffers 32 is expressed by X=n+m, where m is the number of lines (the number of the LDs 34) which are formed simultaneously as one set in the present image forming apparatus 20, and n is the number of types of line data being needed when the plural image quality control sections 31 determine the actual-image-forming state.

Figure 22:
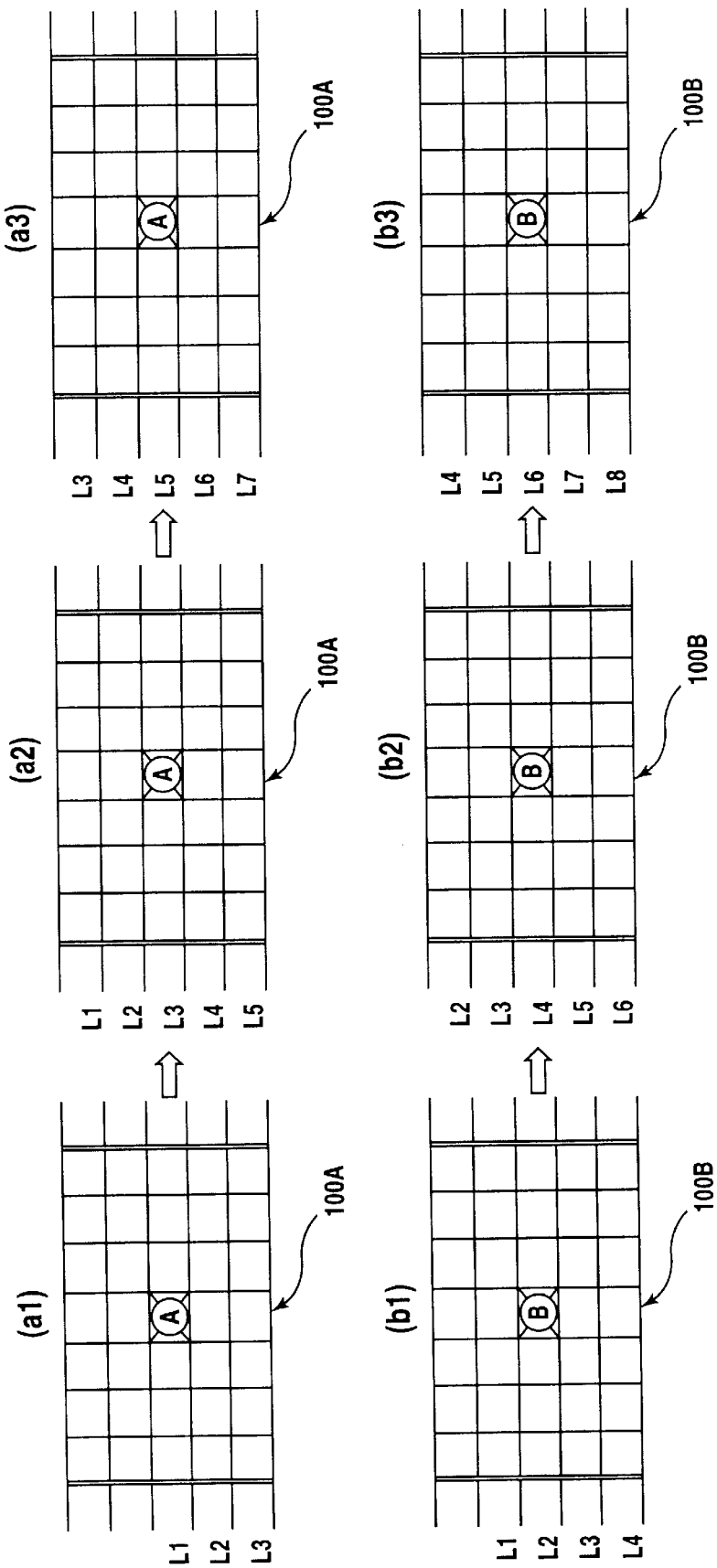
FIGS. 22, (a1) through (a3) and (b1) through (b3) illustrates the manner in which image data is scanned by the image quality control section in the 2-beam mode.
Figure 23:
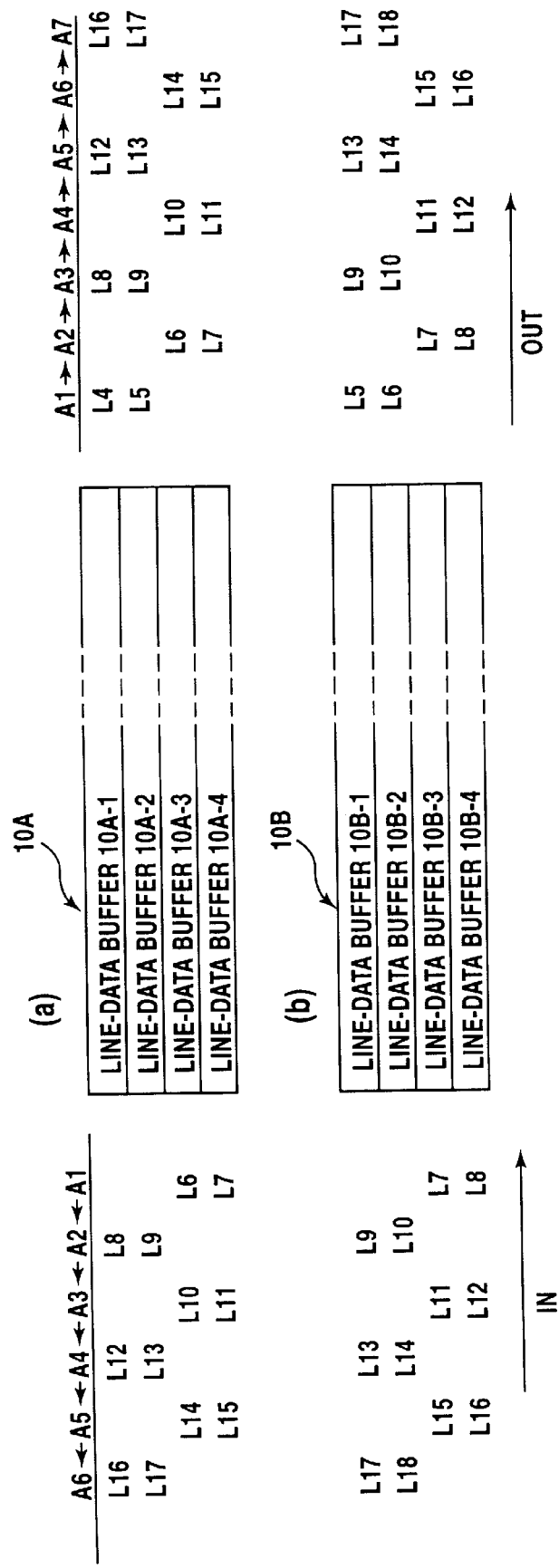
FIGS. 23, (a) and (b), illustrates the manner in which line data is inputted/outputted into/from the buffer section in the 2-beam mode in the conventional image forming apparatus.
Figure 24:
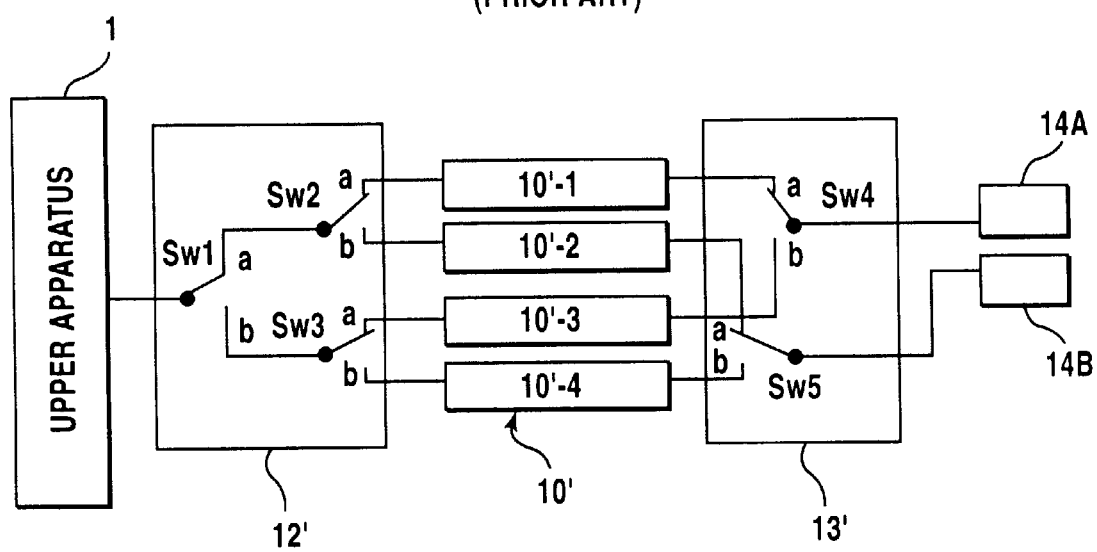
FIG. 24 is a circuit diagram of an image processing section of the conventional image forming apparatus.
Figure 25:
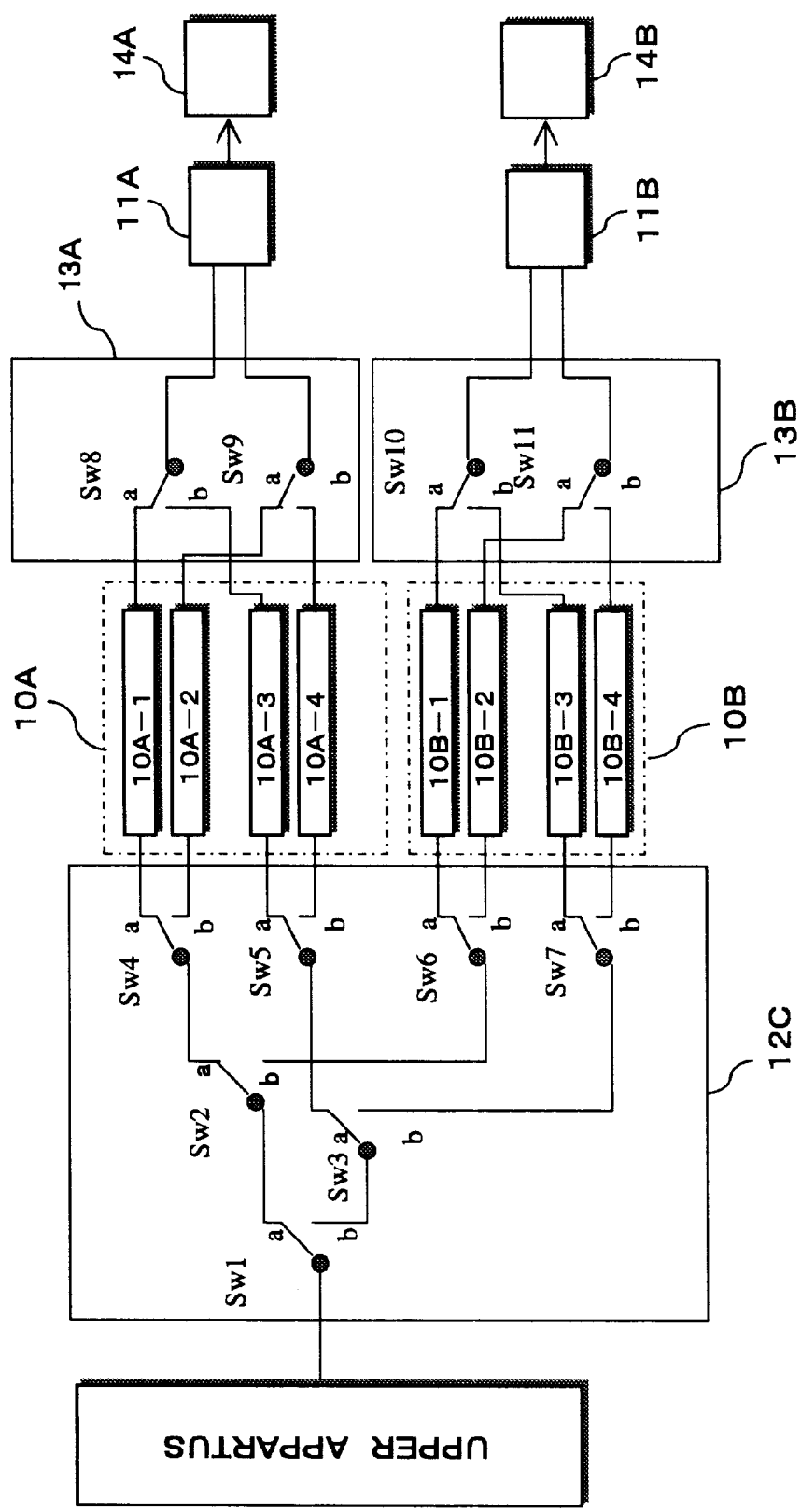
FIG. 25 is a circuit diagram showing a circuit construction of a data-transfer controller and a data-readout controller of an image processing section of the conventional image forming apparatus in which image quality control is executed.

In the 2-beam mode (m=2), for example, n=3 as previously described with reference to FIG. 22 and FIG. 23, and the predetermined number of line-data buffers 32 X=3+2=5.

Likewise, if m=3, X=8; if m=4, X=10; if m=5, X=12; if m=6, X=14; and if m=7, X=16, and so forth. When m is not less than 3, the predetermined number of line-data buffers X=2 (i+1) if m=i (i is a natural number not less than three),.

The line-data buffers 32-1 through 32-5 of the buffer section 30 are shared by the image quality control sections 31A, 31B. The data-store-and-readout control section 36 controls the inputting and outputting of line data in the buffer section 20, and comprises, as shown in FIG. 1, a data-transfer controller 37, a data-readout controller 38, a store-destination switch 39, a readout-destination switch 40, and a switch controller 41.

The data-transfer controller 37 controls the data-store operation of storing the image data received from the upper apparatus 1 into the buffer section 30. And the data-readout controller 38 controls the data-readout operation of reading out the image data from the buffer section into the image quality control sections 31.

Further, the data-transfer controller 37 and the data-readout controller 38 output a timing signal, a buffer-switching timing signal, a read/write timing signal, a buffer address, and so on.

The store-destination switch 39 selects part of the five line-data buffers 32 of the buffer section 30 as destination buffers into which a plurality of (two in the present embodiment) pieces of line data from the upper apparatus are to be simultaneously stored by the data-transfer controller 37.

The readout-destination switch 40 selects one of the two image quality control sections 31A, 31B that needs the respective pieces of line data, as a destination image quality control section to which the pieces of line data simultaneously read out from the remaining line-data buffers 32 of the buffer section 30 by the data-transfer controller 37, are to be transferred.

The switch controller 41 controls the switching operations of the store-destination switch 39 and the readout-destination switch 40 in synchronism with the operation of the selected one of the two image quality control sections 31A, 31B. When the image forming section 35 forms the object image in the second mode (1-beam mode), the switch controller 41 controls the store-destination switch 39 in a way that two of the line-data buffers 32 (the line-data buffers 32-1, 32-2 in the present embodiment) for the second mode to which buffers the line data is to be transferred from the upper apparatus 1, are switched one another in synchronism with the operation of the LD 34A, and at the same time, the switch controller 41 controls also the readout-destination switch 40 in a way that the LD 34A for the second mode to which the line data is to be transferred from the two of the line-data buffers 32 in the second mode, are switched one another.

Meanwhile, the data-store-and-readout control section 36 controls the data store operation of storing two pieces of line data, which are contained in the image data from the upper apparatus 1, simultaneously into two of the five line-data buffers 32 (e.g., line-data buffers 32-1, 32-2) and the data readout operation of reading three pieces of line data from the remaining three line-buffers 32 (e.g., line-data buffers 32-3 through 32-5), simultaneously into the image quality control sections 31A, 31B, in a way that the data store operation and the data readout operation are executed in parallel.

Figure 2:
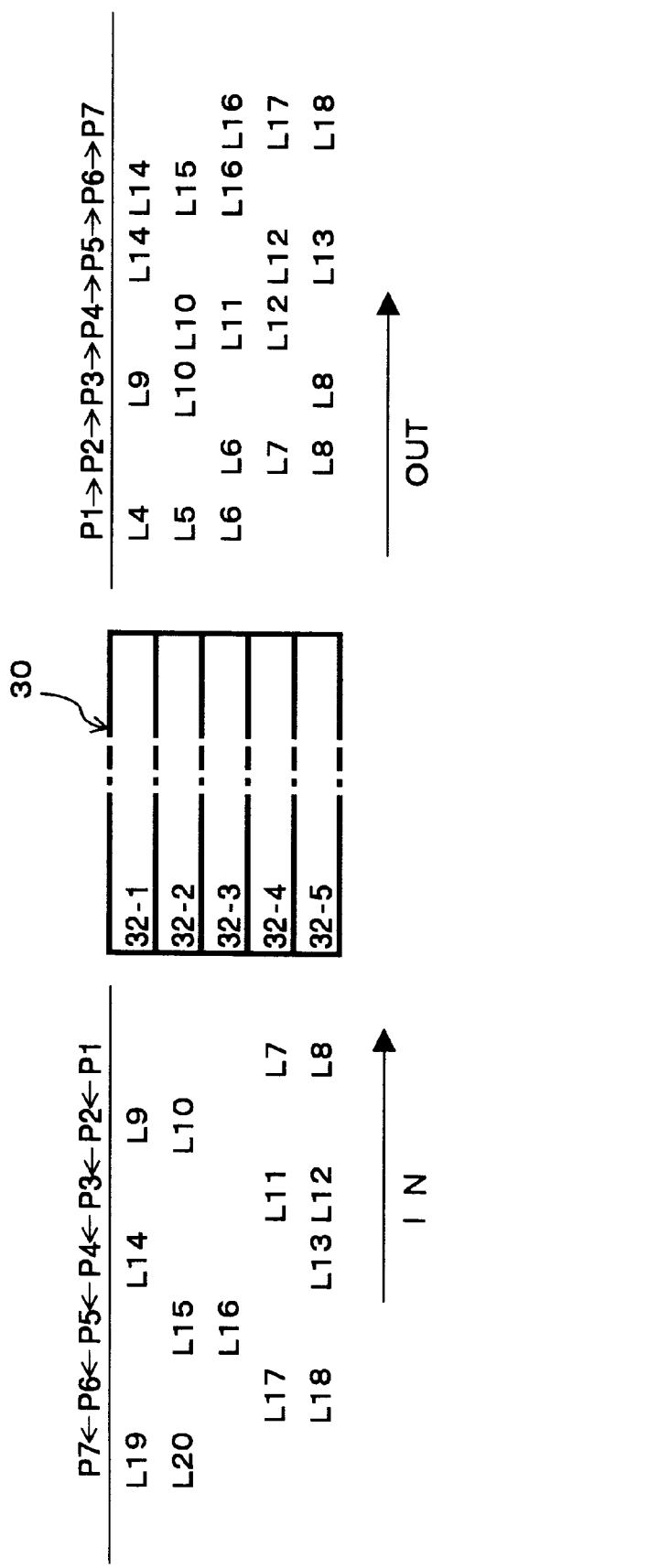
FIG. 2 is a diagram illustrating the manner in which line data is inputted/outputted of line data in a first mode (2-beam mode) in the image processing section of the present embodiment.

FIG. 2 illustrates the inputting and outputting of line data in the first mode (2-beam mode) in the image processing section 90 of the image forming apparatus 20. In FIG. 2, on the left of the buffer section 30, there are shown a plurality of pieces of line data to be transferred to the buffer section 30 by the data-transfer controller 37. And on the right of the buffer section 30, there are shown a plurality of pieces of line data that are read from the buffer section 30 to be input into the image quality control section 31 by the data-readout controller 38.

In the first mode (2-beam mode), when an actual object image is formed in the image processing section 90, both the two image quality control sections 31A and 31B use an identical one piece of line data in the same phase. As illustrated in FIG. 2, after the line data L1 through L3 are transmitted to the image quality control section 31, the image processing section 31 needs the line data L4, L5, L6 in the phase P1. Therefore, the line data L4, L5, L6 are read by the data-readout controller 38 and transmitted to the image quality control section 31 (phase P1). At that time, out of the line data L4 through L6, the line data L4 and L5 are used by the image quality control section 31A, and the line data L5 and L6 are used by the image quality control section 31B, controlling the image forming section 35.

Thus, the line data L5 stored in the line data buffer 32-2 is shared by the image quality control sections 31A and 31B in the phase P1.

Further, in the present embodiment, part of the line data used by the image quality control section 31B can be reused in the next phase by the image quality control section 31A. As illustrated in FIG. 2, the image quality control section 31A can reuse in the phase P2 the line data L6 used by the image quality control section 31B in the phase P1. Thus only the line data L7 has to be transmitted to the image quality control section 31A in the phase P2.

Furthermore, the image quality control section 31B uses the line data L7, L8 in the phase P2. Here the line data L7 is used also by the image quality control section 31A in the phase P2, so only the line data L8 has to be transmitted to the image quality control section 31B.

Accordingly, while the line data L4, L5, and L6 are read out from the buffer section 30 by the data-readout controller 38, the line data L7, L8 of the image data, which is received from the upper apparatus 1, are transferred to the buffer section 30 (phase P1) by the data-transfer controller 37.

Next, the line data L6, L7, L8 are read from the buffer section 30 and are then transmitted to the image quality control section 31A (phase P2) by the data-readout controller 38. Out of these line data L6 through LB, the line data L6, L7 are used by the image control unit 31A, and the line data L7, LB are used by the image control unit 31B, controlling the image forming section 35.

Thus, the line data L7 stored in the line data buffer 32-4 is shared by the image quality control sections 31A and 31B.

While the line data L6, L7, L8 are read from the buffer section 30 by the data-readout controller 38, the line data L9, L10 of the image data, which is received from the upper apparatus 1, are transferred to the buffer section 30 (phase P2) by the data-transfer controller 37.

Thereafter, in a similar manner, both the line data being transferred to the buffer section 30 by the data-transfer controller 37 in the current phase and part of the line data transferred to the buffer section 30 by the data transfer controller 37 in the previous phase, are read from the buffer section 30 and are transmitted to the image quality control section 31 by the data-readout controller 38 in the next phase.

At that time, the image quality control sections 31A and 31B share the line-data buffers 32 to control the image forming section 35.

Specifically, while the data-transfer controller 37 inputs the line data into two (the line-data buffers 32-4 and 32-5, for example) of the five line-data buffers 32-1 through 32-5 of the buffer section 30, the data-readout controller 38 reads the line data from the remaining three line-data buffers (e.g., line-data buffers 32-1 through 32-3).

Part of the pieces of line data that are read out from the three remaining line-data buffers, namely, the middle one of the three pieces of line data (the line data L5, L7, L9, and so on), is shared by the image quality control section 31A and the image quality control section 31B of the image quality control section 31.

The latest one (the line data L6, L8, L10, and so on) of the three pieces of the line data is reused in the next phase.

On the other hand, since only one piece of line data is needed at one time by the image quality control section 31 in the second mode (1-beam mode) the line data is input/output into/from any two of the line-data buffers 32 one after another (not shown).

For example, if the line-data buffers 32-1 and 32-2 of the line-data buffers 32 are used, a new line data is stored in the line-data buffer 32-1 by the data transfer controller 37. Then in the next phase, the thus stored line data is transmitted from the line-data buffer 32-1 to the image quality control section 31 by the data readout controller 38, and, at the same time, the next line data is transferred to the line-data buffer 32-2 by the data-transfer controller 37.

The command acceptance control section 42 receives such commands from the upper apparatus 1 as a resolution instruction or a command to print (an image forming request) while it sends its status to the upper apparatus 1.

The operation mode selecting section 43 interprets the command that the command acceptance control section 42 has received and decides which one of a printer mode or a copy mode is to be selected, what resolution is to be used, and which one of the first mode or the second mode is to be selected, and transmits such information to the synchronization control section 44.

Based on the information of the operation mode and the resolution to be employed, which is received from the operation mode selecting section 43, and with a beam detection signal or the like, which is received from the image forming section 35, the synchronization control section 44 generates a corresponding video clock and transmits a synchronization signal to the upper apparatus 1 and the data-store-and-readout control section 36. The synchronization signal is output as a gate signal, for example, for outputting the video clock or as a data transmission request signal to the upper apparatus 1.

Figure 3:
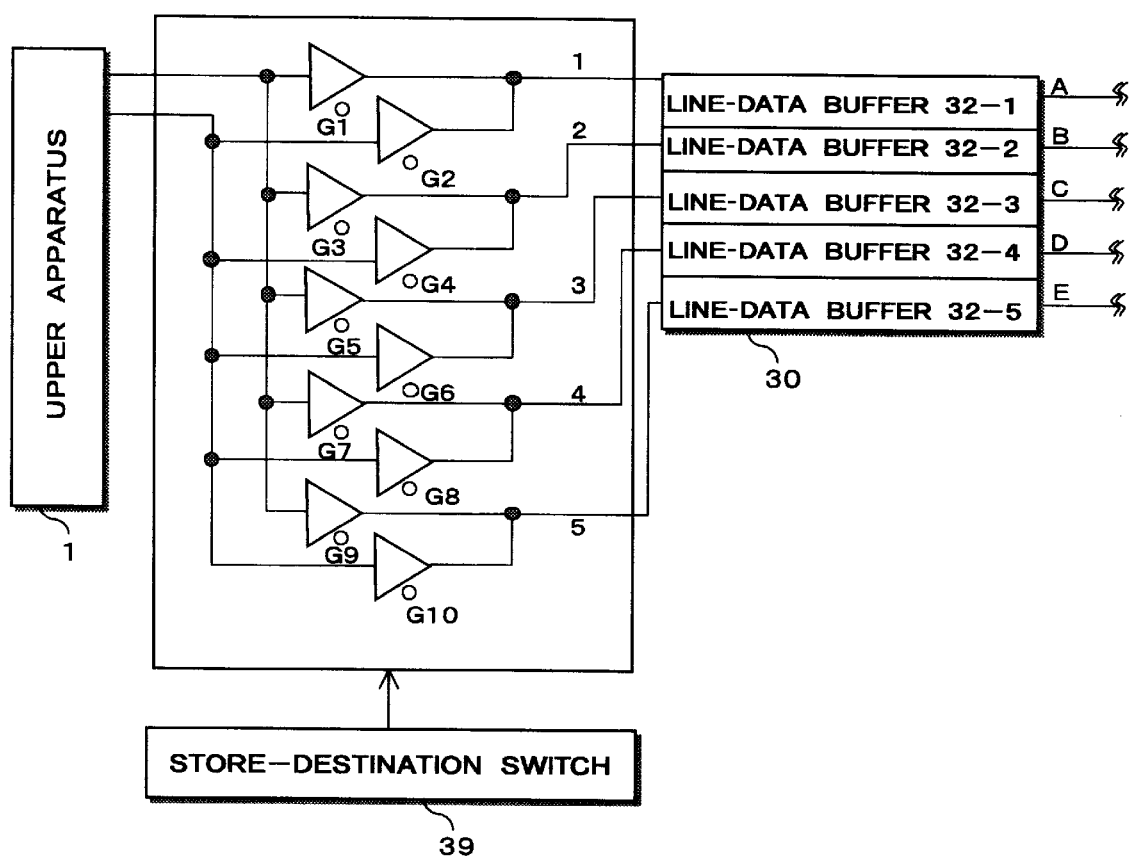
FIG. 3 is a circuit diagram showing a circuit construction of the image processing section of the present embodiment.
Figure 4:
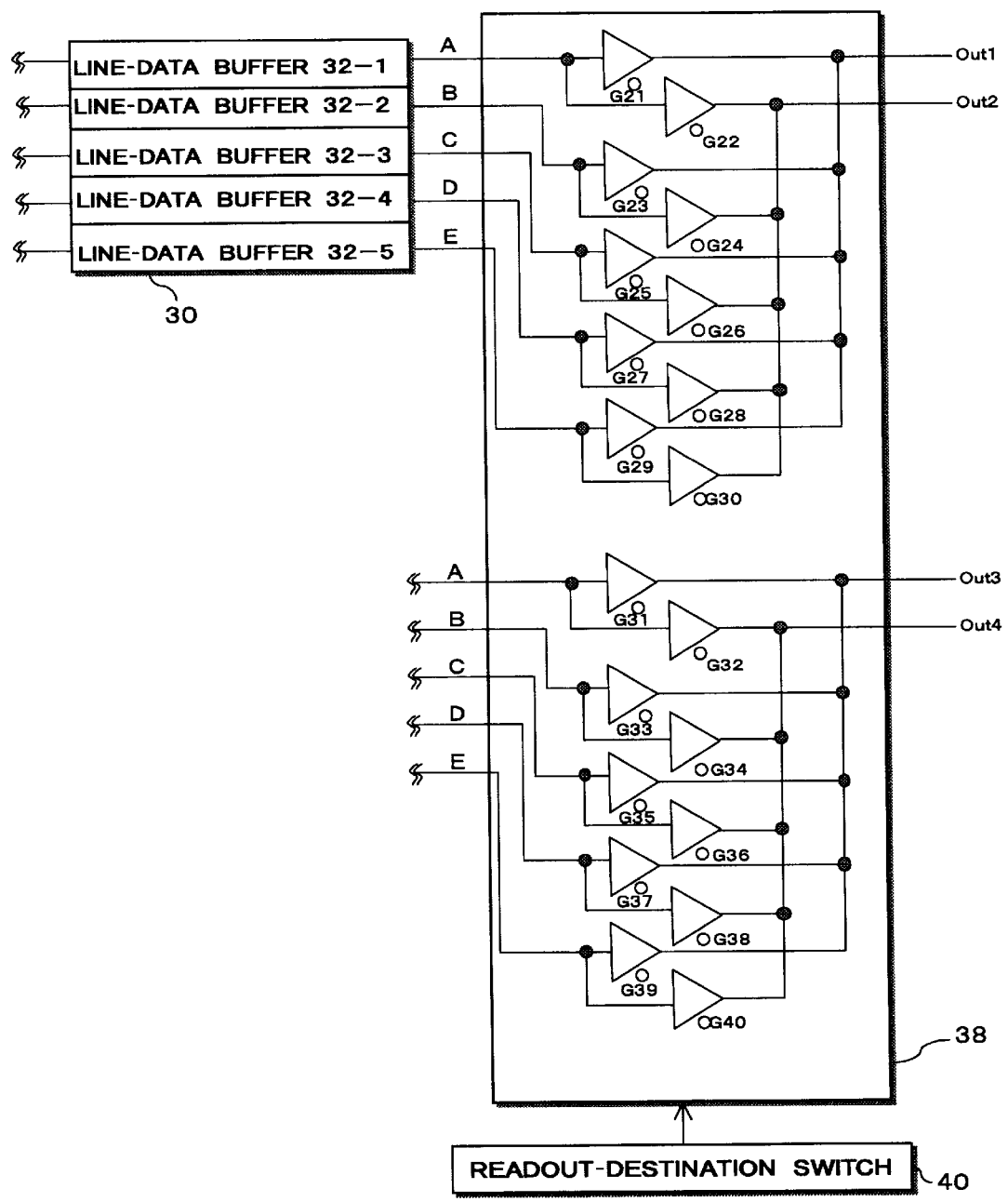
FIG. 4 is a circuit diagram showing a circuit construction of the image processing section of the present embodiment.
Figure 5:
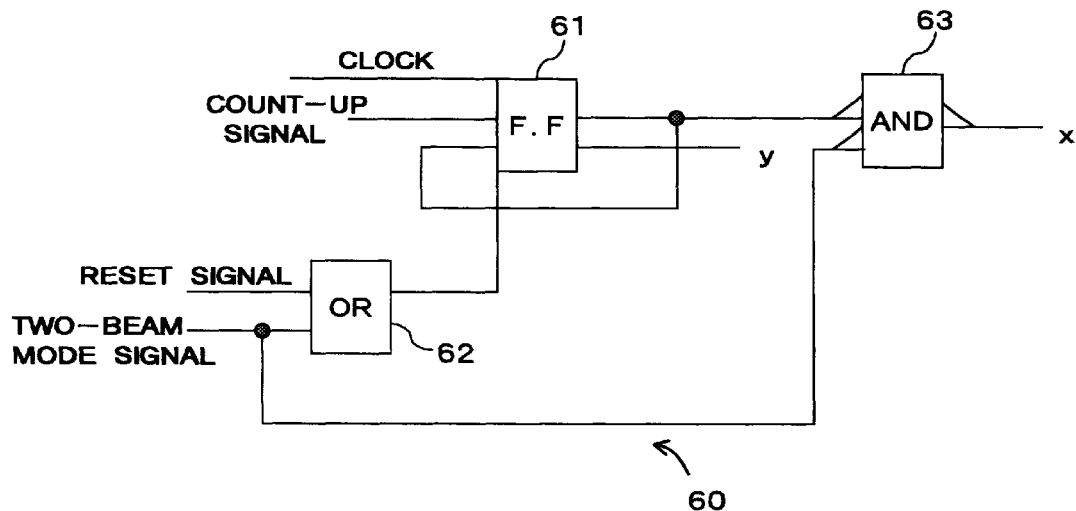
FIG. 5 is a detailed circuit diagram showing a part of the image processing section of the present embodiment.
Figure 6:
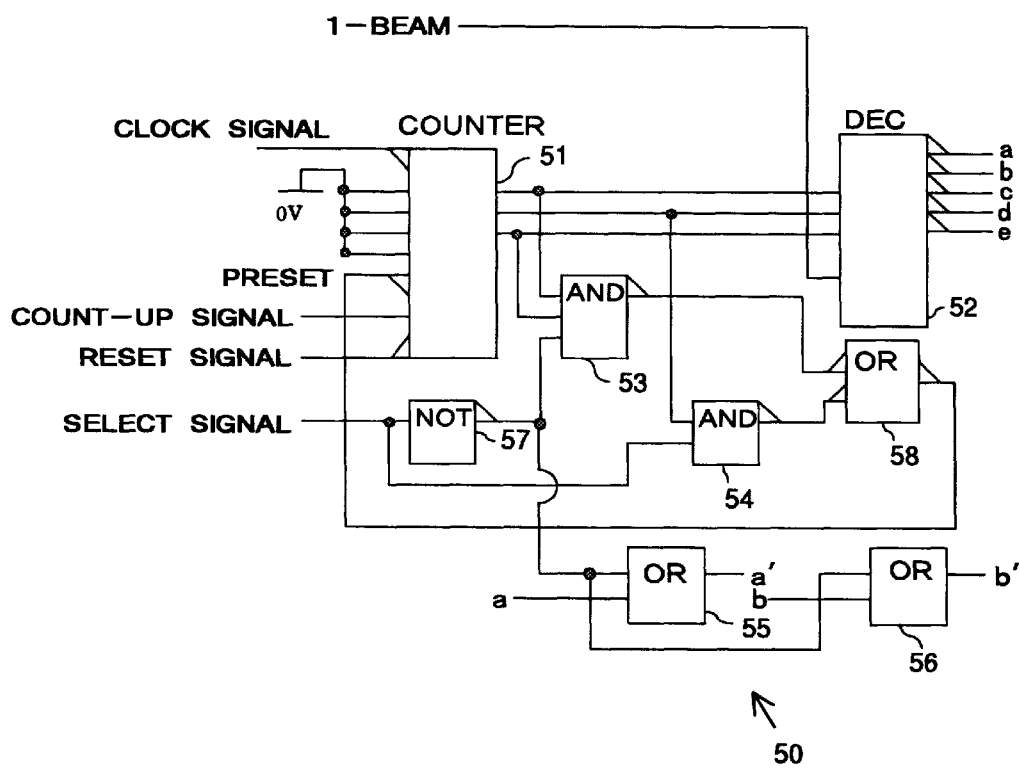
FIG. 6 is a detailed circuit diagram showing another part of the image processing section of the present embodiment.

FIGS. 3 through 6 show a detailed circuit of the image processing section 90 of the present image forming apparatus. FIG. 3 is a circuit diagram of the data-transfer controller 37; FIG. 4 is a circuit diagram of the data-readout controller 38; FIG. 5 is a circuit diagram of a circuit for controlling in the second mode the gate terminal of each data gate of the data-transfer controller 37 and the data-readout controller 38; and FIG. 6 is a circuit diagram of a circuit for controlling in the first mode the gate terminal of each data gate of the data-transfer controller 37 and the data-readout controller 38.

As shown in FIG. 3, the data-transfer controller 37 has the data gates G1 through G10. A signal output from the data gates G1, G2 is input into the line data buffer 32-1; a signal output from the data gates G3, G4, into the line-data buffer 32-2; a signal output from the data gates G5, G6, into the line data buffer 32-3; a signal output from the data gates G7, G8, into the line data buffer 32-4; a signal output from the data gates G9, G10, into the line data buffer 32-5.

As shown in FIG. 4, the data-readout controller 38 has the data gates G21 through G40. The line data stored in the line-data buffer 32-1 is read out through the data gates G21, G22, G31, G32; the line data stored in the line data buffer 32-2, through the data gates G23, G24, G33, G34; the line data stored in the line data buffer 32-3, through the data gates G25, G26, G35, G36; the line data stored in the line data buffer 32-4, through the data gates G27, G28, G37, G38; the line data stored in the line data buffer 32-5, through the data gates G29, G30, G39, G40.

In the data-readout controller 38, Out1 and Out2, as the outputs from the data gates G21 through G30, are output to the image quality control section 31A, which is disposed downstream. Further, Out3 and Out4, as outputs from the data gates G31 through G40, are output to the image quality control section 31B, which is disposed on the downstream side.

In FIG. 4, connections between each of the line data buffers 32 of the buffer section 30 and the data gates G31 through G40 are designated by alphabetical letters A through E.

The data gates G1 through G10 and G21 through G40 each have a gate terminal (enable terminal). When "0" is input into the gate terminal, the corresponding data gate opens to let the data pass therethrough. On the contrary, when "1" is input, the output of the data gate is in a high impedance state. For the purpose of preventing an insufficient output caused by the high impedance state, a buffer input unit or the like is often added to the circuitry along with a non-illustrated pull-up resistor.

The store-destination switch 39 inputs "0" or "1" into the gate terminal of the data gates G1 through G10 based on a preset definition, as will be described later, thereby selecting part of the predetermined number (five, in the present embodiment) of line-data buffers 32 of the buffer section 30 as destination buffers, into which a plurality (two, in the present embodiment) of pieces of line data from the upper apparatus 1 are to be simultaneously stored by the data-transfer controller 37.

The readout-destination switch 40 also inputs "0" or "1" into the gate terminal of the data gates G21 through G40 based on a preset definition, as will be described later, thereby selecting one 31A of the plurality (two, in the present embodiment) of image quality control sections 31 that needs the pieces of line data, as a destination image quality control section, to which the pieces of line data simultaneously read out by the data-readout controller 38 from the remaining ones of the predetermined number (five, in the present embodiment) of line-data buffers 32 of the buffer section 30, are to be transferred.

The data gate controller circuit 60 of FIG. 5, which includes a flip-flop 61, an OR gate 62, and an AND gate 63, controls the gate terminal of the data gates G1 through G10 and G21 through G40 of the data-transfer controller 37 and the data-readout controller 38, respectively, of the image processing section 90 of the present image forming apparatus 20 in the second mode (1-beam mode). In the 1-beam mode, the data gate controller circuit 60 outputs output signals x, y in synchronism with a clock signal sent from the synchronization control section 44.

The data gate controller circuit 60 outputs either one of "0" and "1" at a time as the output signals x, y, which are always different from each other.

In the data gate controller circuit 60, a timing signal (count-up signal 2) output from the data-transfer controller 37 is input into the flip-flop 61. And moreover, a 2-beam mode signal (indicating that image forming should be executed in the 2-beam mode) sent from the operation mode selecting section 43 and a reset signal are input into a reset terminal of the flip-flop 61 via an OR gate 62.

When the flip-flop 61 is reset, "1" is output as the output signal y, while "0" is output as the output signal x, none of the data buffers 32 being selected. In this situation, the data gates G1 and G21 are activated, as will be described later.

A Q-side output of the flip-flop 61 and the 2-beam mode signal is input into the AND gate 63 where an OR circuit is provided as an AND circuit of the negative logic. In the 2-beam mode, since the lower one of the inputs to the AND gate 63 is "1", the output signal x also becomes "1" even if the Q-side output of the flip-flop 61 is "0". Accordingly, "0" is input into every data gate to inactivate the gate.

Meanwhile, the data gate controller circuit 50 of FIG. 6, which includes a counter 51, a decoder 52, an AND gates 53, 54, an OR gates 55, 56, a NOT gate 57, and an OR gate 58, controls the gate terminal of the data gates G1 through G10 and G21 through G40 of the data-transfer controller 37 and the data-readout controller 38, respectively, of the image processing section 90 of the present image forming apparatus 20 in the first mode (2-beam mode). In the 2-beam mode, the data gate controller circuit 50 outputs output signals a though e, a' and b' in synchronism with a clock signal sent from the synchronization control section 44.

The counter 51 is a quinary counter into which a count-up signal 1 output from the data-transfer controller 37 is intermittently input. As the successive count-up signals 1 are input, the counter 51 counts up one by one starting from 0 and outputs the thus obtained count value to the decoder 52 in synchronism with the clock signal sent from the synchronization control section 44. After the count value reaches 4, the counter 51 is preset to 0 for restarting the counting.

The decoder 52 receives the count value (0 through 4) from the counter 51 and decodes the value as described later. Depending on the count value, "0" is output as one of the output signals a through e of the decoder 52. Meanwhile, "1" is always output as the remaining ones of the output signals a through e other than the one being "0".

Further, in the 1-beam mode, the decoder 52 receives "1" as the input from the operation mode selecting section 43. In the 1-beam mode, every one of the output signals a through e becomes "1", so that the data gate controller circuit 50 becomes inactivated.

Furthermore, the counter 51, the AND gates 53, 54, the NOT gate 57, and the OR gate 58 jointly constitute an binary counter in which, if a select signal is input ("1" is input) and then the count value of the counter 51 becomes "2", the counter 51 is preset.

Figures 7, 8:
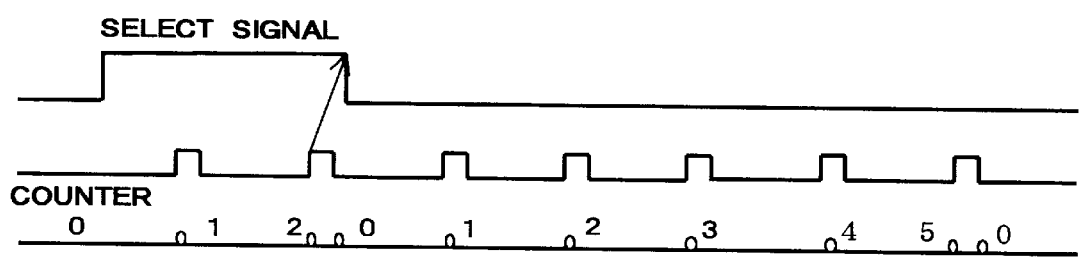
FIG. 7 is a table illustrating the manner in which a decoder of a data gate controller circuit operates.
FIG. 8 is a timing chart indicating the relation between a select signal and count values from a counter.

FIG. 7 illustrates the operation of the decoder 52 of the data gate controller circuit 50. As shown in FIG. 7, the decoder 52 outputs "0" as one of the output signals a through e depending on the output (0, 1, 2, 3, or 4) of the counter 51.

The NOT gate 57 and the OR gate 55 receive a select signal, which takes "1" when the image forming apparatus is powered on or reset or when a front end of a print sheet is detected. When the select signal becomes off (0), the counter 51 is preset in response to the output of the AND gate 53.

Further, the output signal a from the decoder 52 is input also into the OR gate 55. When both the output signal a and the select signal are "0", "0" is output as the output signal a'.

Likewise, the output signal b is input also into the OR gate 56. When both the output signal b and the select signal are "0", "0" is output as the output signal b'.

FIG. 8 is a timing chart showing a relation between the select signal and the count value of the counter 51. As shown in FIG. 8, in the data gate controller circuit 50 of the FIG. 6, when the count value of the counter 51 becomes 2 after the select signal is on (1), the select signal becomes off (0) and, at the same time, the counter 51 is preset. Subsequently the counter 51 restarts counting.

FIGS. 9 and 10 show matrices defining the switching operations of the store-destination switch 39 and readout-destination switch 40 under the control of the switch controller 40. Specifically, FIG. 9 shows the matrix defining the switching in the data gates G1 through G10 which is performed by the store-destination switch 39, and FIG. 10 shows the matrix defining the switching in the data gates G1 through G10 which is performed by the store-destination switch 40.

The manner in which the data-transfer controller 37 controls a data store operation of storing the data into the buffer section 30 and the data-readout controller 38 controls a data-readout operation of reading out the data from the buffer section 30, will now be described with reference to the FIGS. 9 and 10.

When image forming is performed in the 1-beam mode (the second mode), the data-transfer controller 37 outputs timing signals: out of these timing signals, the count-up signal 2 is intermittently input into the flip-flop 61 of the data gate controller circuit 60.

Then, in the data gate controller circuit 60, at each time the count-up signal 2 is input, the flip-flop 61 is reversed to output opposite output signals x and y, which are alternately "0" and "1". Since the flip-flop 61 has been reset for the beginning, the output signal x is "0" and the output signal y is "1".

As shown in FIGS. 9 and 10, the output signal x is input into the data gates G1, G23 and the output signal y is input into the data gates G3, G21. Since the output signal x is "0" at the start, the data gate G1 opens to allow the image data (serial data) received from the upper apparatus 1 to pass therethrough for storing in the line-data buffer 32-1.

After completion of storing the line data into the line-data buffer 32-1, the count-up signal 2 is output from the data-transfer controller 37 as a single pulse, reversing the flip-flop 61. As a result, the output signal x becomes "1" and the output signal y becomes "0".

Then in the data-readout controller 38, in response to the output signal y, the data gate G21 opens to render the data-readout controller 38 to read the image data (data-readout operation) from the line-data buffer 32-1 via the data gate G21. Thus the data read out is sent to the image quality control section 31A as Out 1.

At the same time, in the data-transfer controller 37, "1" is input to the data gate G1 and "0" is input to the data gate G3, opening the data gate G3 and hence enabling the data-store operation into the line-data buffer 32-2.

After that, the next count-up signal 2 is input into the flip-flop 61, reversing the flip-flop again. As a result, "0" is output as the output signal x and "1" is output as the output signal y. Accordingly the data-store operation into the line data buffer 32-1 and the data-readout operation from the line data buffer 32-2 are performed, whereupon the output from the line-data buffer 32-2 is sent to the image quality control section 31A as Out 2.

Thus, in the 1-beam mode (the second mode), the image data (line data) received from the upper apparatus 1 are stored into one of the line-data buffers 32-1, 32-2 one after another, while the other line data stored in the remaining one line-data buffer to which the data-store operation is not being performed, is read out and then transferred to the image quality control section 31A.

On the other hand, in image forming in the 2-beam mode (the first mode), the data gate controller circuit 50 of FIG. 6 is activated.

In the data gate controller circuit 50, the binary counter composed of the counter 51, the AND gates 53, 54, the NOT gate 57, and the OR gate 58, are activated only when the select signal is "1", namely, when the image forming apparatus is powered on or reset or when a front end of a print sheet is detected.

In the binary counter, when the select signal is "1", the counter 51 counts up one by one, 0, 1, and 2. When the count value reaches "2", the counter 51 is preset, or in response to the count value, the output signals a, b are output from the decoder 52.

The output signal a is input into the OR gate 55, and the output signal b is input into the OR gate 56, respectively, along with the select signal. The select signal is ORed with the output signal a by the OR gate 55 to obtain the output signal a', while the select signal is ORed with the output signal b by the OR gate 56 to obtain the output signal b'.

After the select signal becomes off (0), the counter 51 counts up one by one from 0 to 5 and then is preset to restart counting from 0. This preset operation is performed in such a manner that when the select signal is "0", the AND output of both the select signal having passed through the inverter (the NOT gate 57) and the output of the counter 51 is input into the preset terminal of the counter 51 by the AND gate 54 and the OR gate 58.

At the start of counting, the count value to be output from the counter 51 is "0", and the output signal a of the output of the decoder 52 corresponding to the count value becomes "0", as shown in FIG. 7. Subsequently, each time the count-up signal 1 is input from the data-transfer controller 37 into the counter 51, the count value of the counter 51 is incremented by one, so that the output signals (a through e) of the decoder 52 become "0" one after another in the alphabetic order (a, b, c, d, and e).

If the next count-up signal 1 is input after the count value reaches 4, the counter 51 is preset by the AND gates 53, 54, the NOT gate 57, and the OR gate 58. Accordingly, the count value of the counter 51 circulates from 0 to 4, namely, 0, 1, 2, 3, 4, 0, 1, 2, . . . so that the output signals (a through e) of the decoder 52 become "0" one after another in the alphabetic order (a, b, c, d, and e).

As shown in FIGS. 9 and 10, the outputs of the decoder 52 are associated with the respective gate terminals of the data gates G1 through G10 and G21 through G40 of FIG. 3 and FIG. 4, respectively.

When the power turns on, when a reset is performed or when the front end of the print sheet is detected, the select signal is output as described above. Therefore the output signal a' is output from the data gate controller circuit 50, so that the data gates G1, G4 of the data-transfer controller 37 are opened, as indicated in FIG. 9, to store the image data (line data) into the line-data buffers 32-1, 32-2. At that time, the data-readout operation is not yet executed by the data readout controller 38.

Next, as depicted in FIG. 9, when the output signal b' is output from the data gate controller circuit 50, the data gates G5, G8 of the data-transfer controller 37 are opened to store the line data into the line-data buffers 32-3, 32-4.

After that, as depicted in FIG. 8, when the select signal becomes off (0), the counter 51 is preset and the output signals a through e of the decoder 52 are enabled. Then, as depicted in FIG. 9, the output signal a of the outputs of the decoder 52 becomes "0", and the data gates G7, G10 of the data-transfer controller 37 are opened to store the line data into the line-data buffers 32-4, 32-5.

Meanwhile, in the data-readout controller 38, as depicted in FIG. 10, the data gates G21, G24, G33, G36 are opened to transmit the line data from the line-data buffers 32-1, 32-2 to the image quality control section 31A, and from the line-data buffers 32-2, 32-3 to the image quality control section 31B.

FIG. 11 shows the relation between the output signal of the decoder 52 and the line-data buffers 32 in the image processing section 90 of the present image forming apparatus, namely, indicating which ones of the line-data buffers 32 the data are to be stored into or read out from in response to the respective output signals of the decoder 52. As dedicated in FIG. 11, as the output signals of the decoder 52 change sequentially, the line data buffers 32 into which the line data are to be stored by the data-transfer controller 37 and from which the line data is read out also change sequentially.

Here in FIG. 11, the settings "SET UP NO. 1" and "SET UP NO. 2" designate the initial operations caused by the select signal at the start point.

Moreover, FIG. 12 depicts the data storing operation to the line-data buffers 32 by the data-transfer controller 37, defining the order numbers by which the line data are stored into the individual line-data buffers 32. In such a order as shown in FIG. 12, the line data are stored into the individual line-data buffers 32.

Specifically, in the data-transfer controller 37, first at "SET UP NO. 1", the data gates G1, G4 are opened to store the first line data into the line-data buffers 32-1, 32-2.

Next at "SET UP NO. 2", the data gates G5, G8 are opened to store the next line data in the line-data buffers 32-3, 32-4.

Thus, the initial operation to be executed when the power is turned on, when a reset is performed, or when the front end of the print sheet is detected, is completed, whereupon the data gates G7, G10 are opened at the step NO. 1 to store the line data into the line data buffers 32-4, 32-5.

Subsequently, likewise, the data gates G1 through G10 are opened in accordance with the matrix of FIG. 9 so that the necessary line data can be surely sent to the image quality control section 31 as depicted in FIG. 12.

FIG. 13 illustrates the data readout operation of reading the data from the line data buffers 32, to be performed by the data-readout controller 38, showing the order number by which the line data is read out from each of the line data buffers 32 by the data-readout controller 38. The line data is read from each of the line-data buffers 32 in such an order as depicted in FIG. 13 and is then transmitted to the image quality control sections 31A, 31B.

Specifically, in the data-readout controller 38, at first (step NO. 1), the data gates G21, G24, G33, and G36 are opened to transmit to the image quality control section 31B the line data stored in the line-data buffers 32-1, 32-2 as Out 1, Out 2 and the line data stored in the line-data buffers 32-2, 32-3 as Out 3, Out 4, respectively.

Next, at step NO. 2, the data gates G25, G28, G37, and G40 are opened to transmit to the image quality control section 31B the line data stored in the line-data buffers 32-3, 32-4 as Out 1, Out 2 and the line data stored in the line-data buffers 32-4, 32-5 as Out 3, Out 4, respectively.

Subsequently, likewise, the data gates G21 through G40 are opened in such a manner as depicted in FIG. 10 so that the necessary line data can be surely sent to the image quality control section 31 as depicted in FIG. 13.

With this construction, in the present image forming apparatus 20, when an object image data along with an image forming request is transmitted from the upper apparatus 1, the command acceptance control section 42 receives the image forming request and the operation mode selection section 43 selects one of the first mode (2-beam mode) and the second mode (1-beam mode) in which the image forming operation is to be performed.

Here if the first mode is selected (in the first mode), the data gate controller circuit 50 operates such that the switch controller 41, the store-destination switch 39, and the data-transfer controller 37 store the image data (line data) from the upper apparatus 1 into the line data buffers 32 of the buffer section 30 one after another in accordance with the settings of the FIGS. 7 and 9.

As determined in FIG. 7 and FIG. 10, the switch controller 41, the readout-destination switch 40, and the data-readout controller 38 read the line data stored in the line-data buffers 32 one after another for transmission to the image quality control sections 31A, 31B.

The image quality control section 31 determine an actual-image-forming state of an individual dot, for every dot to be formed by each of the LDs 34, based on the regional image information of that individual dot contained in the image data and the regional image information of other dots adjacent to that individual dot, and output the determined actual-image-forming state to each of the LDs 34, thereby controlling the image-forming state of the object image to be formed by the image forming section 35.

Meanwhile, if the second mode is employed (in the second mode), the data gate controller circuit 60 operates such that the switch controller 41, the store-destination switch 39, and the data-transfer controller 37 store the image data (line data) from the upper apparatus 1 into one of the line data buffers 32-1 and 32-2 of the buffer section 30 one after another in accordance with the settings of the FIG. 9.

As determined in FIG. 10, the switch controller 41, the readout-destination switch 40, and the data-readout controller 38 read the line data stored in one of the line-data buffers 32-1 and 32-2, which is not undertaking the data-store operation, one after another for transmission to the image quality control sections 31A, 31B.

The image quality control section 31 determines an actual-image-forming state of an individual dot, for every dot to be formed by the LD 34 (LD 34A), based on the regional image information of that individual dot contained in the image data and the regional image information of other dots adjacent to that individual dot, and outputs the determined actual-image-forming state to the LD 34 (LD 34A), thereby controlling the image-forming state of the object image to be formed by the image forming section 35.

The optical unit 3 exposes the photosensitive body 4 to light from the LD 34, and in synchronism with this, the paper feed system 6 starts feeding the print sheet.

Then the processing unit 5 develops a patterned area (electrostatic latent image) on the circumferential surface of the photosensitive body 4, which has a potential as exposed to light, with toner, whereupon the toner image is transferred to the surface of the paper as the paper is brought into contact with the surface of the photosensitive body 4. Subsequently, the paper feed system 6 feeds the paper, with the toner image on it, to the fixing device where the toner image is fixed to complete the forming of an object image on the paper.

Thus in the image forming apparatus of the present embodiment, the image quality control sections 31A, 31B share the line-data buffers 32 of the buffer section 30 so that no dedicated buffer section for every image quality control section 31 is required, reducing the number of line-data buffers 32. This simplifies the circuits (data gate controller circuit 50, 60) constituting the data-transfer controller 37 and the data-readout controller 38 and hence results in an improved circuit integration and a reduced manufacturing cost.

Given that the line-data buffers 32 are shared, it is unnecessary to receive/transmit the same line data in duplicate between the data-transfer controller 37, the buffer section 30, and the data-readout controller 38, which would improve the efficiency of data transfer.

With the image forming apparatus of the present embodiment, it is possible to switch the first mode, in which a plurality of LDs 34 are simultaneously used for image forming, with the second mode, in which only one of the LDs 34 is used. And the data can be surely processed even when the operation mode is being changed with another.

As a preferred feature, in the image forming apparatus of the present embodiment, since the data-store-and-readout control section 36 controls the order in which the image data (line data) is to be processed, it would suffice that the upper apparatus 1 simply transmits the image data, resulting in speeding up of image forming.

As another preferred feature, in the image forming apparatus of the present embodiment, since every dot sequence contained in the object image is formed by the laser beam emitted from the dot-sequence forming unit in the form of the LDs 34A, 34B, easy manufacture of the present image forming apparatus would be possible.

The present invention should by no means be limited to illustrated embodiment, and various changes or modifications may be made without departing from the scope of the present invention.

For example, in the present embodiment, only the 2-beam mode, in which the two LDs 34A, 34B are employed, is described as the first mode, in which a plurality of dot sequences are formed simultaneously as one set. Alternatively, three or more LDs may be employed.

Further, in the present embodiment, the line data transfer from the data-transfer controller 37 to the buffer section 30 is performed in series. Alternatively, the line data transfer may be performed in parallel.

Furthermore, in the present embodiment, the dot-sequence forming system is in the form of the LD (semiconductor laser) 34. Alternative dot-sequence forming systems may be suggested.

What is claimed is:

1. An image forming apparatus for forming an object image based on image data from an image-forming request source, the image data including a multiplicity of pieces of line data relating to the object image, each piece of line data corresponding to a dot sequence for a single line of the object image and containing regional image information of the individual dots composing the dot sequence, said apparatus comprising:

an image forming section having a plurality of dot-sequence forming units for forming a plurality of dot sequences simultaneously as one set, which sequences correspond to a plurality of pieces of line data contained in the image data and are disposed adjacent to one another, said image forming section being operative to form whole of the object image in a first mode, in which the object image is formed in units of the dot-sequence sets one set after another, repeatedly using said plurality of dot-sequence forming units;

a plurality of image quality control sections, corresponding to the respective dot-sequence forming units, for determining an actual-image-forming state of each of the dots to be formed by the corresponding dot-sequence forming unit, based on the regional image information of each said dot and that of other dots adjacent to each said dot, and for outputting the determined actual-image forming state of each said dot to the associated dot-sequence forming unit to thereby control the object image in quality;

a buffer section having a predetermined number of line-data buffers each for storing the line data of an individual line received from the image-forming request source as the image data to temporarily hold the image data from the image-forming request source between the image-forming request source and said image quality control sections, said buffer section being shared by said image quality control sections; and a data-store-and-read control section for controlling a data store operation of storing a plurality of pieces of line data, which are contained in the image data from the image-forming request source, simultaneously into part of said predetermined number of line-data buffers, and a data readout operation of reading a plurality of pieces of line data, which are stored in the remaining part of said predetermined number of line-data buffers, simultaneously to said image quality control sections, in a way that the data store operation and the data readout operation are executed in parallel;

said predetermined number of said line-data buffers is set to a minimum necessary number X, which is expressed by $$X=n+m$$

where m is the number of lines which are formed simultaneously as one set in the present image forming apparatus, and n is the number of types of line data needed when the plural image quality control sections determine the actual-image-forming state, to execute the data store operation and the data readout operation in accordance with both the number of said dot-sequence forming units and the number of pieces of line data needed when said image quality control sections respectively determine the actual image forming states of the individual dots.

2. An image forming apparatus according to claim 1, wherein said data-store-and-readout control section includes:

a data-transfer controller for controlling the data-store operation;

a data-readout controller for controlling the data readout operation;

a store-destination switch, responsive to said data-transfer controller, for selecting part of said line-data buffers as destination buffers into which the pieces of line data are to be simultaneously stored;

a readout-destination switch, responsive to said data-readout controller, for selecting part of said image quality control sections as a destination image quality control section to which the pieces of line data simultaneously read out from the remaining line-data buffers are to be transferred; and a switch controller for controlling the switching operations of said store-destination switch and said readout-destination switch in synchronism with the operation of the selected part of said image quality control sections.

3. An image forming apparatus according to claim 2, wherein said image forming section has a function of forming the object image in a selected one of the first mode and a second mode in which the object image is formed stepwise one at a single dot sequence using a selected one of said dot-sequence forming units, and wherein when said image forming unit forms the object image in said second mode, said switch controller controls said store-destination switch in a way that at least two of said line-data buffers for said second mode to which buffers the line data is to be transferred from the image-forming request source are changed from one to another in synchronism with the operation of said selected dot-sequence forming unit in said second mode, and said switch controller controls also said readout-destination switch in a way that said selected dot-sequence forming unit for said second mode to which unit the line data is to be transferred from said at least two of said line-data buffers in said second mode are changed from one to another.

4. An image forming apparatus according to claim 3 wherein each of said dot-sequence forming units includes a semiconductor laser for emitting a laser beam to form each dot-sequence, which constitutes part of the object image.

5. An image forming apparatus according to claim 2 wherein each of said dot-sequence forming units includes a semiconductor laser for emitting a laser beam to form each dot-sequence, which constitutes part of the object image.

6. An image forming apparatus according to claim 1, wherein each of said dot-sequence forming units includes a semiconductor laser for emitting a laser beam to form each dot-sequence, which constitutes part of the object image.

7. An image forming apparatus for forming an object image based on image data from an image-forming request source, the image data including a multiplicity of pieces of line data relating to the object image, each piece of line data corresponding to a dot sequence for a single line of the object image and containing regional image information of the individual dots composing the dot sequence, said apparatus comprising:

an image forming section having a plurality of dot-sequence forming units for forming a plurality of dot sequences simultaneously as one set, which sequences correspond to a plurality of pieces of line data contained in the image data and are disposed adjacent to one another, said image forming section being operative to form whole of the object image in a first mode, in which the object image is formed in units of the dot-sequence sets one set after another, repeatedly using said plurality of dot-sequence forming units;

a plurality of image quality control sections, corresponding to the respective dot-sequence forming units, for determining an actual-image-forming state of each of the dots to be formed by the corresponding dot-sequence forming unit, based on the regional image information of each said dot and that of other dots adjacent to each said dot, and for outputting the determined actual-image forming state of each said dot to the associated dot-sequence forming unit to thereby control the object image in quality;

a buffer section having a predetermined number of line-data buffers each for storing the line data of an individual line received from the image-forming request source as the image data to temporarily hold the image data from the image-forming request source between the image-forming request source and said image quality control sections, said buffer section being shared by said image quality control sections; and a data-store-and-read control section for controlling a data store operation of storing a plurality of pieces of line data, which are contained in the image data from the image-forming request source, simultaneously into part of said predetermined number of line-data buffers, and a data readout operation of reading a plurality of pieces of line data, which are stored in the remaining part of said predetermined number of line-data buffers, simultaneously to said image quality control sections, in a way that the data store operation and the data readout operation are executed in parallel;

said data-store-and-readout control section includes a data-transfer controller for controlling the data-store operation, a data-readout controller for controlling the data readout operation, a store-destination switch, responsive to said data-transfer controller, for selecting part of said line-data buffers as destination buffers into which the pieces of line data are to be simultaneously stored, a readout-destination switch, responsive to said data-readout controller, for selecting part of said image quality control sections as a destination image quality control section to which the pieces of line data simultaneously read out from the remaining line-data buffers are to be transferred, and a switch controller for controlling the switching operations of said store-destination switch and said readout-destination switch in synchronism with the operation of the selected part of said image quality control sections;

said image forming section having a function of forming the object image in a selected one of the first mode and a second mode in which the object image is formed stepwise one at a single dot sequence using a selected one of said dot-sequence forming units;

said switch controller being operable, when said image forming unit forms the object image in said second mode, to control said store-destination switch in a way that at least two of said line-data buffers for said second mode to which buffers the line data is to be transferred from the image-forming request source are changed from one to another in synchronism with the operation of said selected dot-sequence forming unit in said second mode, and to control also said readout-destination switch in a way that said selected dot-sequence forming unit for said second mode to which unit the line data is to be transferred from said at least two of said line-data buffers in said second mode are changed from one to another.

8. An image forming apparatus according to claim 7 wherein each of said dot-sequence forming units includes a semiconductor laser for emitting a laser beam to form each dot-sequence, which constitutes part of the object image.

* * * * *